(12) United States Patent
Allen

(10) Patent No.: US 12,126,157 B2
(45) Date of Patent: Oct. 22, 2024

(54) CABLE STABILIZER FOR TELECOMMUNICATIONS ENCLOSURE

(71) Applicant: CommScope Technologies LLC, Hickory, NC (US)

(72) Inventor: Barry Wayne Allen, Siler City, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/983,567

(22) Filed: Nov. 9, 2022

(65) Prior Publication Data

US 2023/0145954 A1    May 11, 2023

Related U.S. Application Data

(60) Provisional application No. 63/277,485, filed on Nov. 9, 2021.

(51) Int. Cl.
*H02G 3/32* (2006.01)
*H02G 3/00* (2006.01)

(52) U.S. Cl.
CPC ............. *H02G 3/32* (2013.01); *H02G 3/263* (2013.01)

(58) Field of Classification Search
None
See application file for complete search history.

(56) References Cited

U.S. PATENT DOCUMENTS

| | | | |
|---|---|---|---|
| 6,406,194 B1* | 6/2002 | Neale, III | G02B 6/3624 174/152 G |
| 8,371,540 B1* | 2/2013 | Medlin, Jr. | H02G 3/32 52/715 |
| 8,387,927 B1* | 3/2013 | Medlin, Jr. | H02G 3/32 52/715 |
| 8,746,633 B1* | 6/2014 | Medlin, Jr. | H02G 3/32 248/65 |
| 10,811,862 B2* | 10/2020 | Kempeneers | H02G 15/046 |
| 11,428,293 B2* | 8/2022 | Briskey | H04Q 1/06 |
| 2004/0113028 A1* | 6/2004 | Grendahl | H02G 3/32 248/68.1 |
| 2008/0298765 A1* | 12/2008 | Cox | G02B 6/4444 385/139 |
| 2014/0133806 A1* | 5/2014 | Hill | G02B 6/3897 385/77 |
| 2018/0284359 A1* | 10/2018 | Akieda | G02B 6/3888 |
| 2019/0006827 A1* | 1/2019 | Gintz | F16L 3/223 |
| 2019/0204522 A1* | 7/2019 | Courchaine | G02B 6/4452 |
| 2021/0072480 A1* | 3/2021 | Briskey | G02B 6/4442 |

\* cited by examiner

*Primary Examiner* — Steven M Marsh
(74) *Attorney, Agent, or Firm* — Merchant & Gould P.C.

(57) ABSTRACT

Aspects of the disclosure relate to a telecommunications enclosure. The telecommunications enclosure includes a housing with an interior. The housing includes a port sleeve which defines a cable port for routing a cable into the interior of the housing. The enclosure additionally includes a cable stabilizer that fits within the port sleeve. The cable stabilizer includes a cable anchoring portion configured to allow the cable to be secured thereto within the port sleeve.

33 Claims, 20 Drawing Sheets

CABLE STABILIZER FOR TELECOMMUNICATIONS ENCLOSURE

CROSS-REFERENCE TO RELATED APPLICATION

This application claims the benefit of U.S. Provisional Application No. 63/277,485, filed Nov. 9, 2021, and titled "CABLE STABILIZER FOR A TELECOMMUNICATIONS ENCLOSURE" the disclosure of which is hereby incorporated herein by reference.

Technical Field

The present disclosure relates generally to enclosures such as telecommunications enclosures. More particularly, the present disclosure relates to a cable stabilizer that fits within a port sleeve of a telecommunications enclosure.

BACKGROUND

Telecommunications networks often use enclosures for containing and protecting telecommunications equipment (e.g., splice locations, optical splitters, multiplexers, connection panels, electrical grounding locations, etc.). Enclosures used in outside environments are desirably sealed to prevent moisture intrusion. In some examples, ports where cable enter enclosures are sealed by heat shrink sleeves.

SUMMARY

Cables entering ports of telecommunications enclosures are, in some cases, relatively stiff. When a relatively stiff cable is secured to a port of an enclosure with a shape-memory sleeve such as a heat shrink sleeve, lateral loading on the cable can cause the cable to pivot at the heat shrink sleeve which causes the cable to move within the enclosure. This type of movement is undesirable as it can cause damage to internal components within the enclosure or disconnections within the enclosure. One aspect of the present disclosure relates to using a cable stabilizer within the cable port to provide a cable anchoring location offset axially from the heat shrink sleeve to prevent pivoting of the cable at the heat shrink sleeve.

In one aspect, the present disclosure relates to an enclosure assembly. The enclosure assembly includes a housing defining an interior. The housing additionally includes a port sleeve defining a cable port for routing a cable into the interior of the housing. The port sleeve additionally includes an outer end positioned at an exterior of the housing and an inner end positioned at the interior of the housing. The enclosure assembly includes a cable stabilizer that fits within the port sleeve. The cable stabilizer includes a cable anchoring portion configured for allowing the cable to be secured thereto within the port sleeve. The cable stabilizer also includes a lateral stabilization portion that engages an interior of the sleeve to prevent lateral movement of the cable anchoring portion of the cable stabilizer within the sleeve. The enclosure assembly additionally includes a heat shrink sleeve for securing the cable to the outer end of the sleeve and to seal the cable relative to the sleeve.

In some examples, the lateral stabilization portion includes an outer cylindrical curvature that fits within an inner cylindrical curvature of the sleeve, the outer cylindrical curvature defining at least a portion of a cylinder. In some examples, the cable stabilizer defines an axial cable passage that extends along a central axis, and the outer cylindrical portion extends more than 180 degrees about the central axis. In some examples, the outer cylindrical portion extends at least 200 degrees, or 210 degrees or 220 degrees about the central axis. In some examples, the cable stabilizer is configured such that the cable is anchored so as to be generally centered along the central axis.

In some examples, the cable stabilizer has a wrap-around configuration with an open side facing in a lateral direction for allowing the cable to be laterally inserted into the axial cable passage of the cable stabilizer.

In some examples, the cable stabilizer is loaded into the port sleeve through the inner end of the port sleeve and includes an axial stop for limiting a depth the cable stabilizer can be inserted into the port sleeve. In some examples, the cable stabilizer is configured such that the cable is anchored to the cable anchoring portion prior to installation of the cable stabilizer in the port sleeve. The axial stop can be defined by a radial flange of the cable stabilizer adapted to seat on the inner end of the port sleeve.

In some examples, the cable anchoring portion is adapted to accommodate a first cable having a first cross-dimension size, and the cable stabilizer includes a first spacer adapted to be attached to the cable anchoring portion to accommodate a second cable having a second cross-dimension size, and the second cross-dimension size is smaller than the first cross-dimension size. In some examples, the cable stabilizer includes a second spacer adapted to be attached to the cable anchoring portion to accommodate a third cable having a third cross-dimension size, and wherein the third cross-dimension size is smaller than the second cross-dimension size.

In some examples, the cable anchoring portion is configured to generally center the first cable along a central cable pass-through axis of the cable stabilizer, and wherein the first spacer is configured to generally center the second cable along a central cable pass-through axis of the cable stabilizer when mounted to the cable anchoring portion.

In some examples, the cable anchoring portion includes flexible anchoring arms between which the cable is secured. In some examples, the cable is secured to ends of the arms and wherein the arms flex toward the cable as the cable is secured to the ends of the arms. In some examples, the flexible anchoring arms have a cantilevered configuration with base ends integral with at least one base support, the at least one base support defined by the cable stabilizer and free ends that project into a cable pass-through channel of the cable stabilizer. In some examples, the flexible arms extend outwardly from one base support. In some examples, the flexible arms extend from two base supports towards one another from the base ends to the free ends. In some examples, the cable is secured to the cable anchoring portion via a strap or tape. In some examples, the strap includes a band clamp or a tie wrap.

A variety of additional aspects will be set forth in the description that follows. The aspects relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

FIG. 26 is a bottom view of the cable stabilizer of FIG. 25;

DETAILED DESCRIPTION

Figure 1:
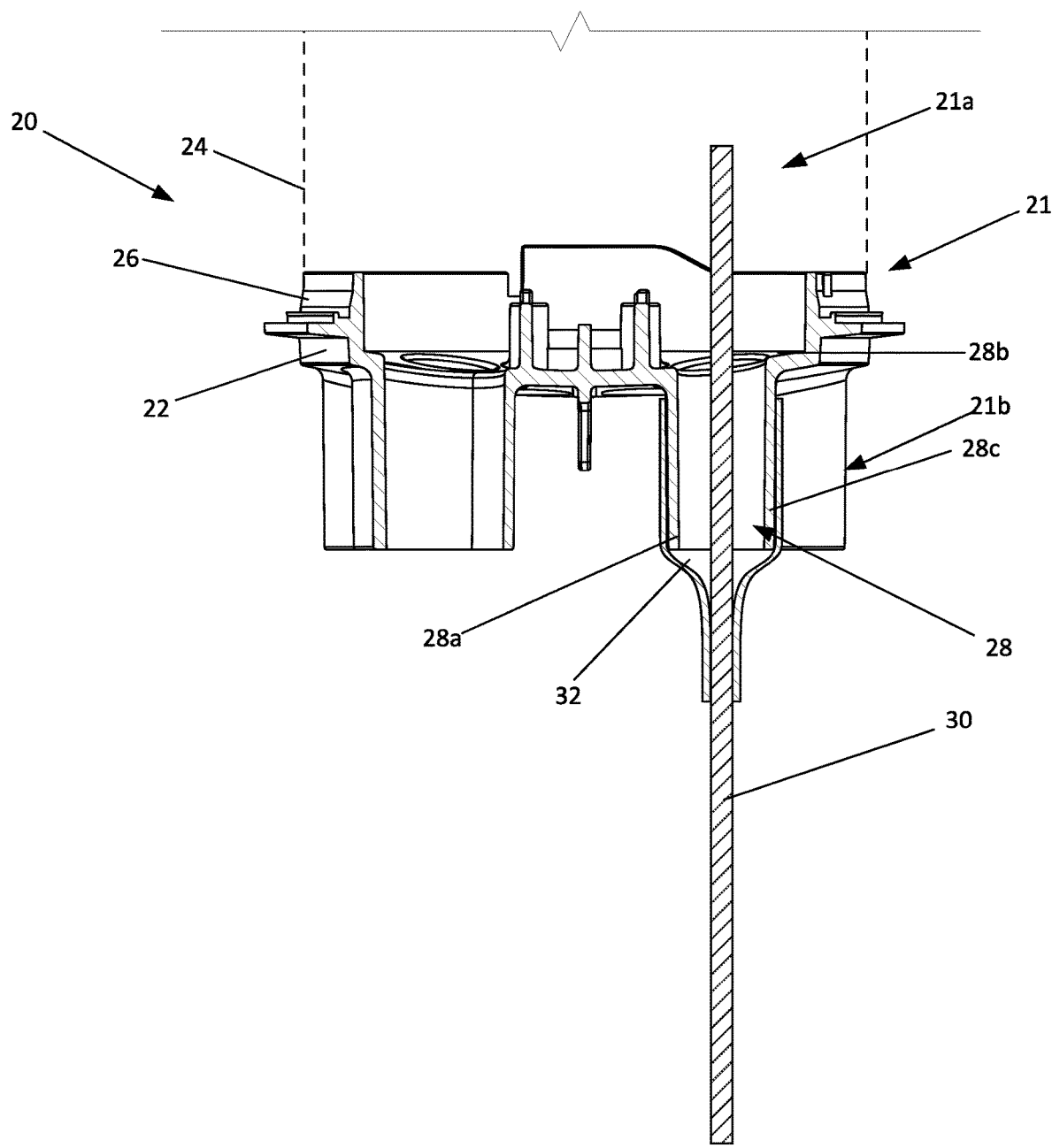
FIG. 1 is a prior art telecommunication enclosure in accordance with a cable routed through a port of the cable enclosure.
Figure 2:
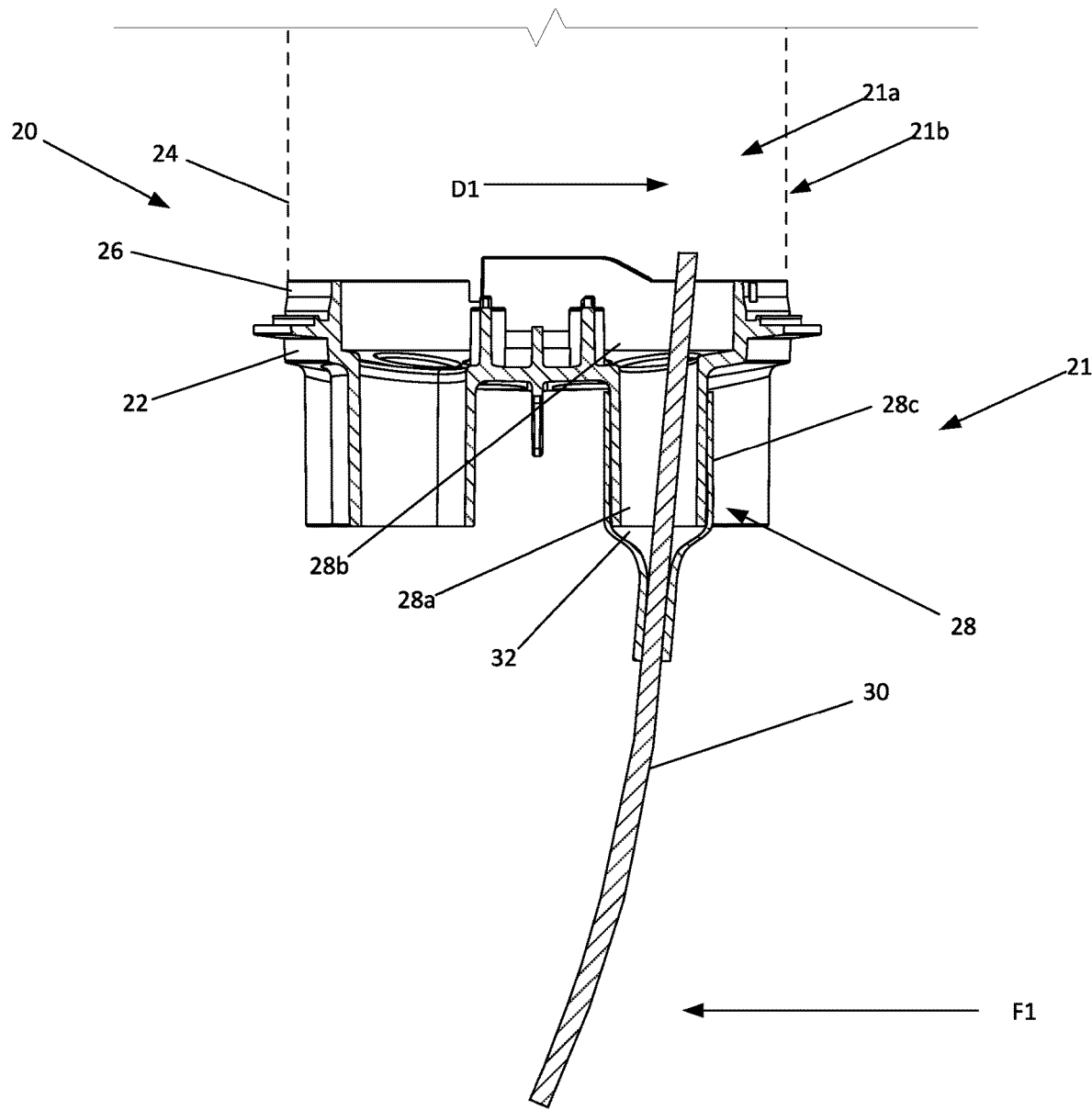
FIG. 2 is the telecommunications enclosure of FIG. 1 with a lateral load being applied in a first direction to the cable at an exterior of the telecommunications enclosure.
Figure 3:
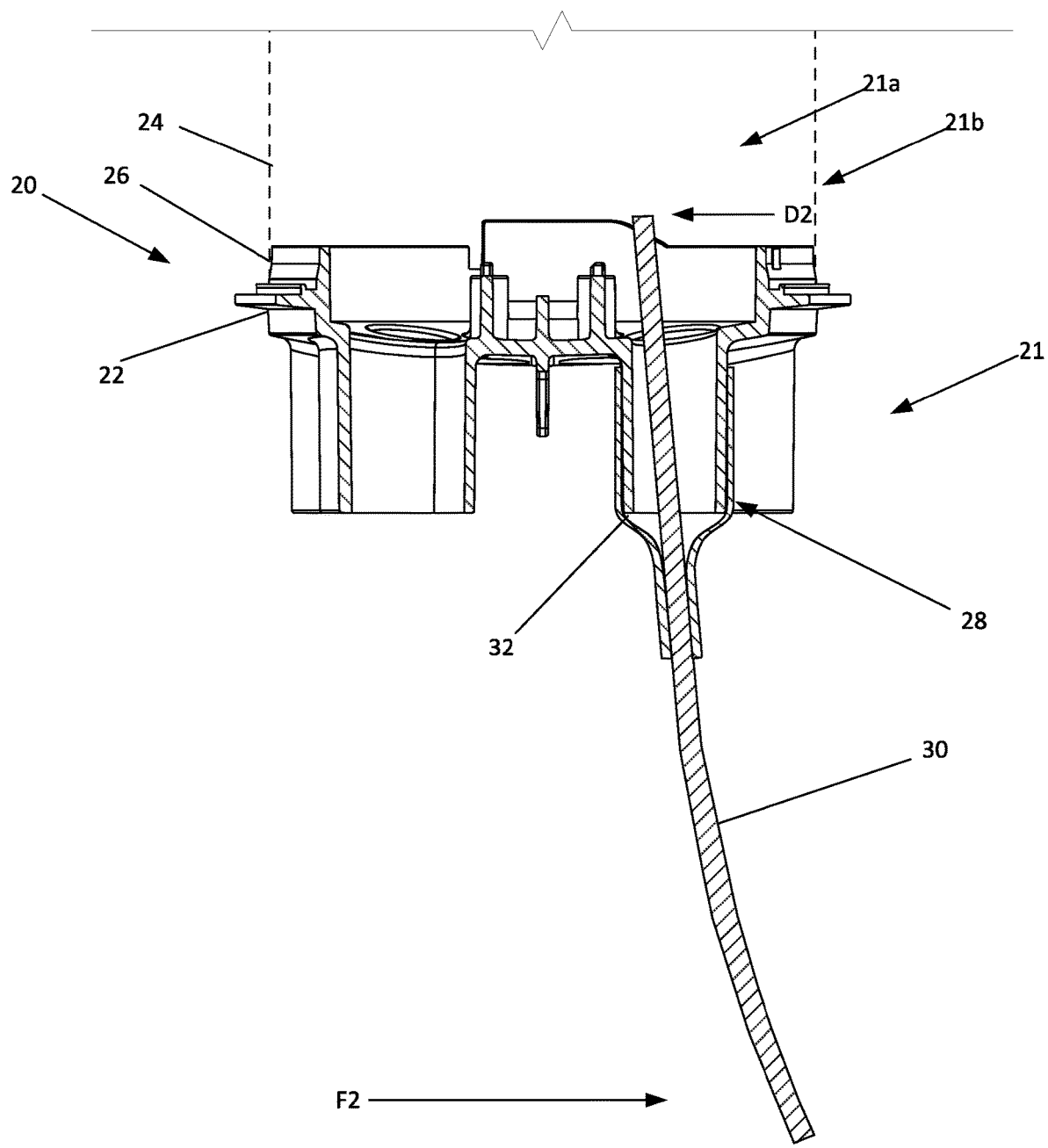
FIG. 3 is the telecommunications enclosure of FIG. 1 with a lateral load being applied in a second direction to the cable at an exterior of the telecommunications enclosure.

FIGS. 1-3 illustrate a sectional view of a prior art telecommunications enclosure 20. The telecommunications enclosure 20 includes a housing 21. The housing 21 includes first and second housing pieces 22, 24 that fit together to close the housing. The first housing piece 22 is depicted as a base and the second housing piece 24 is depicted as a dome or cover. The first and second housing pieces 22, 24 meet at a sealing interface 26 that forms a perimeter seal between the first and second housing pieces 22, 24 when the first and second housing pieces 22, 24 are fitted together. The first and second housing pieces 22, 24 define an interior 21a of the enclosure 20. The housing 21 additionally includes an exterior 21b defined by the exterior of the first and second housing pieces 22, 24. The first housing piece 22 includes a port sleeve 28 which defines a cable port for routing a cable 30 into the interior 21a of the housing 21. The port sleeve 28 includes an outer end 28a positioned at the exterior 21b of the housing 21 and an inner end 28b positioned at the interior 21a of the housing 21. The cable is surrounded by a shape-memory sleeve 32 which is a heat shrink sleeve. The shape-memory sleeve 32 secures the cable relative to the outer end 28a of the port sleeve 28 and seals the cable 30 relative to the port sleeve 28. When no side loads are applied to the cable 30, the portion of the cable within the housing aligns with a centerline of the port sleeve 28. FIG. 2 shows the cable 30 being subjected to a lateral force F1 from outside of the housing 21 and below the shape-memory sleeve 32. The cable 30 is pivoted within the housing in a first direction D1 away from the centerline of the port sleeve 28 due to the force F1. FIG. 3 similarly shows the cable 30 subjected to a second opposite lateral force F2 from outside the housing 21 and below the shape-memory sleeve 32. The cable 30 is pivoted within the housing 21 in a second direction D2 away from the centerline of the port sleeve 28 due to the second lateral force F2.

Figure 4:
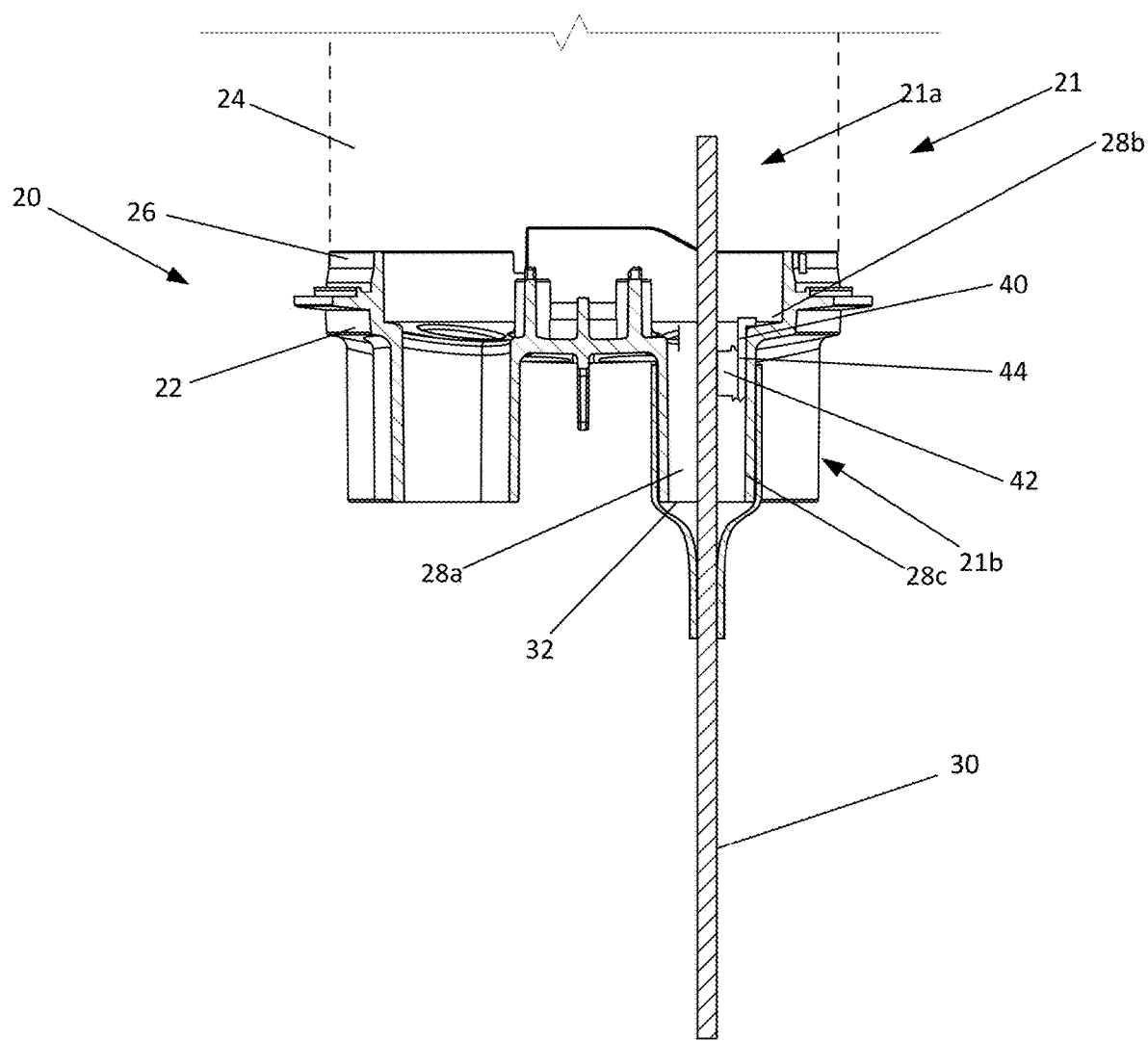
FIG. 4 is the telecommunications enclosure of FIG. 1 including a cable stabilizer in accordance with the principles of the present disclosure supporting a cable routed through a cable port of the enclosure.
Figure 5:
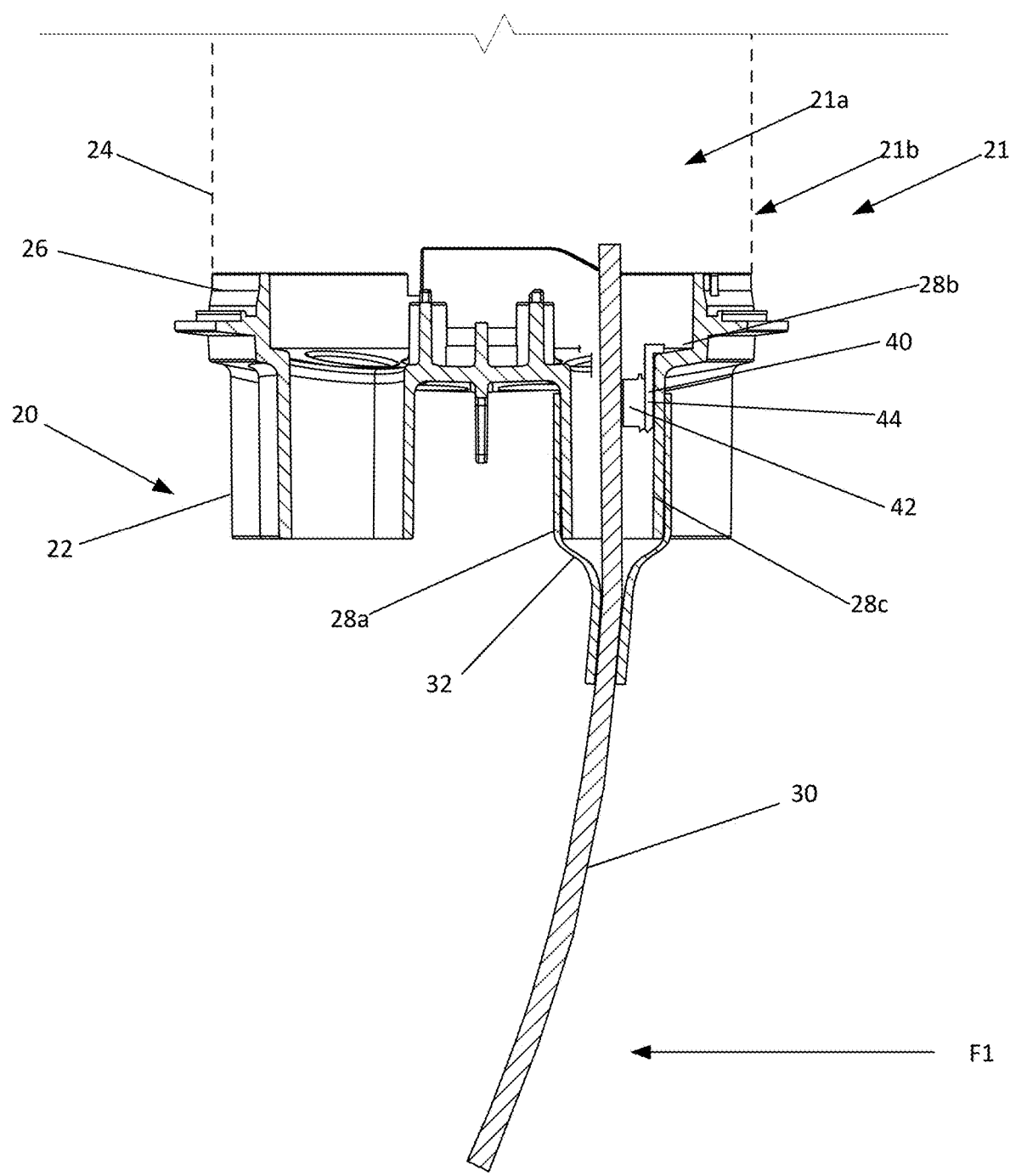
FIG. 5 is the telecommunications enclosure of FIG. 4 with a lateral load being applied in a first direction to the cable at an exterior of the telecommunications enclosure.
Figure 6:
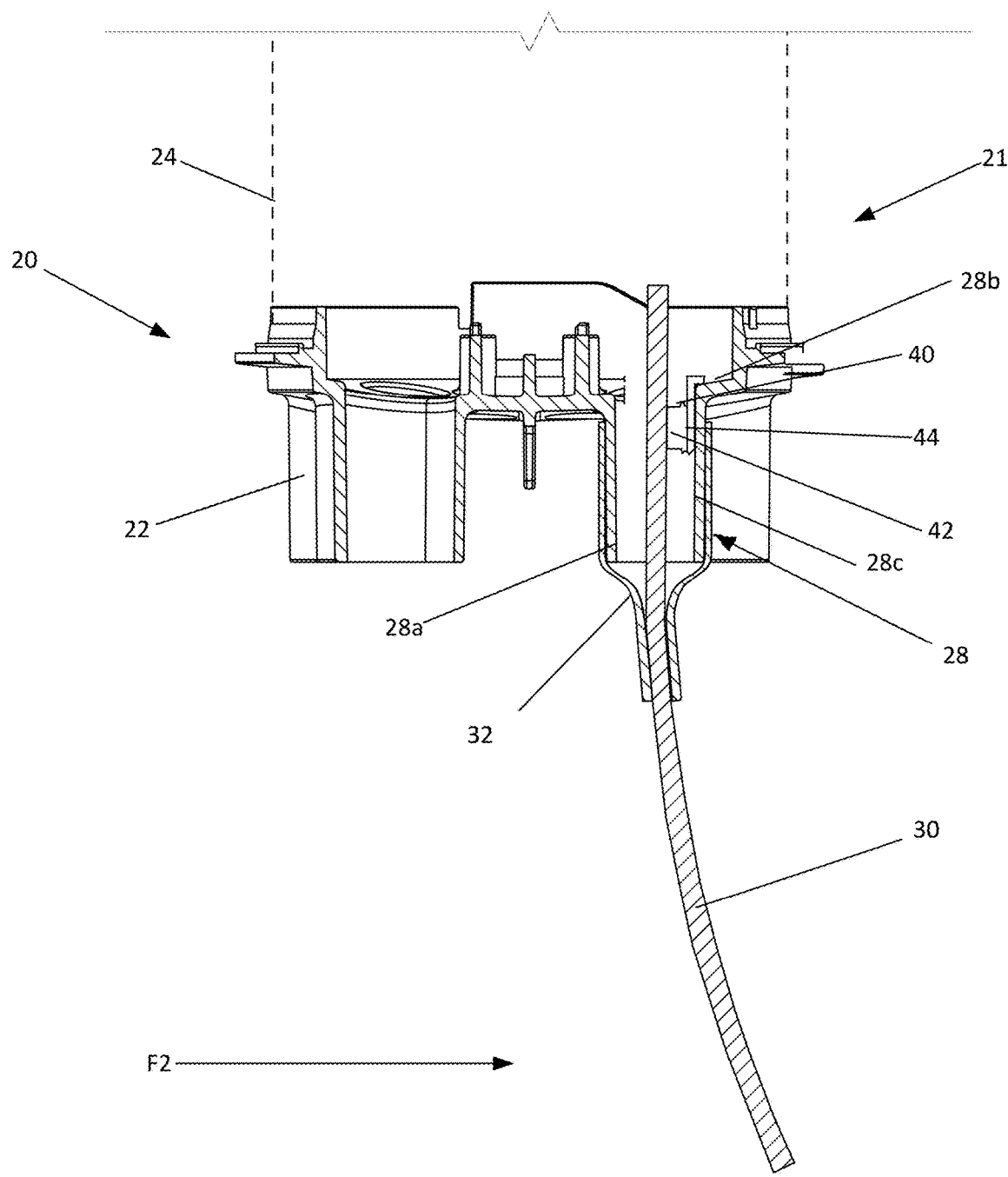
FIG. 6 is the telecommunications enclosure of FIG. 4 with a lateral load being applied in a second direction to the cable at an exterior of the telecommunications enclosure.

Referring to FIG. 4, the enclosure 20 is shown including a cable stabilizer 40 fitted within the port sleeve 28. The cable stabilizer 40 includes a cable anchoring portion 42. The cable anchoring portion 42 is configured to allow the cable 30 to be secured to the cable stabilizer 40. The cable stabilizer 40 additionally includes a lateral stabilization portion 44 which engages an inner cylindrical curvature 28c of the port sleeve 28. In the depicted example, the inner cylindrical curvature defines an inner diameter of the port sleeve 28. FIGS. 5 and 6 show the cable 30 being subjected to forces F1 and F2 respectively. As the cable 30 is secured to the cable stabilizer 40, the cable does not pivot within the housing 21 and remains straight at the interior of the housing.

Figure 7:
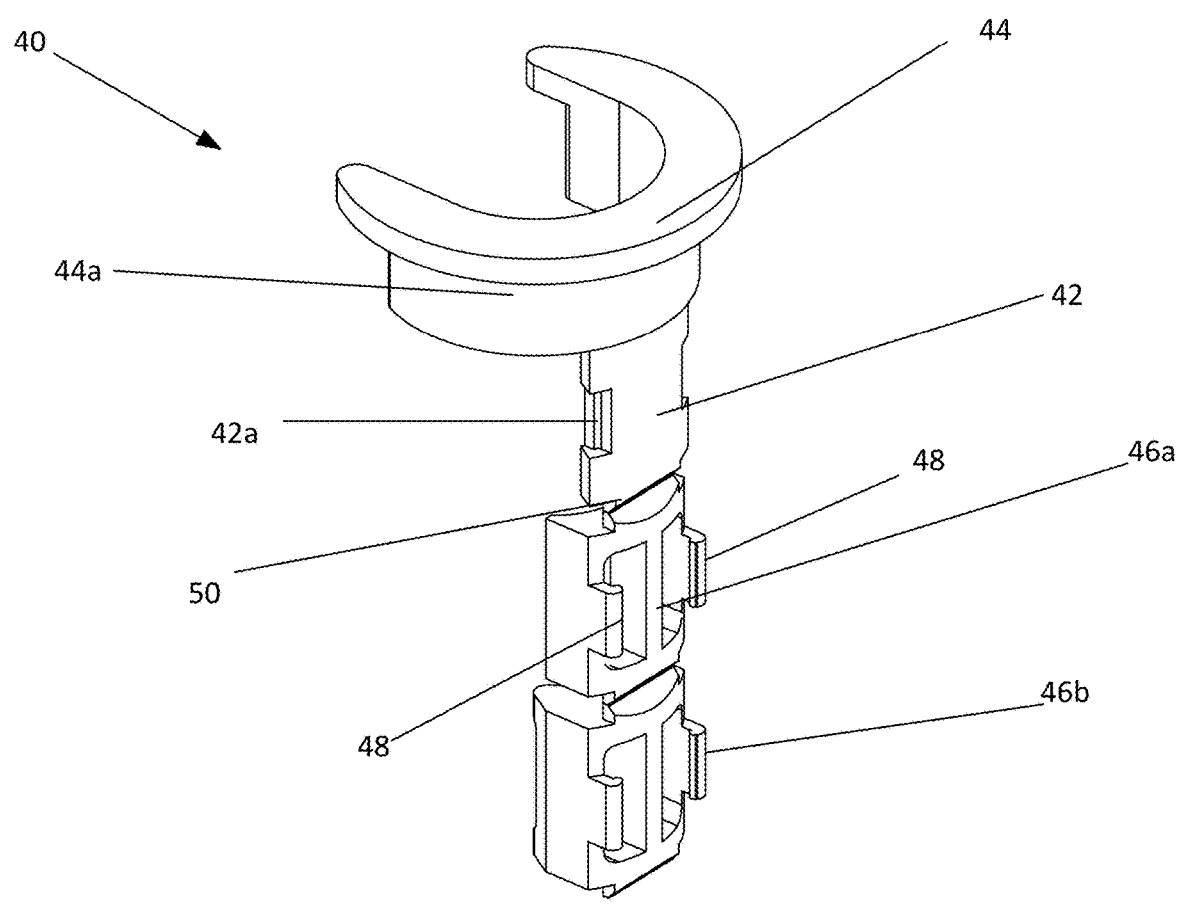
FIG. 7 is a cable stabilizer in accordance with the principles of the present disclosure in isolation.
Figure 8:
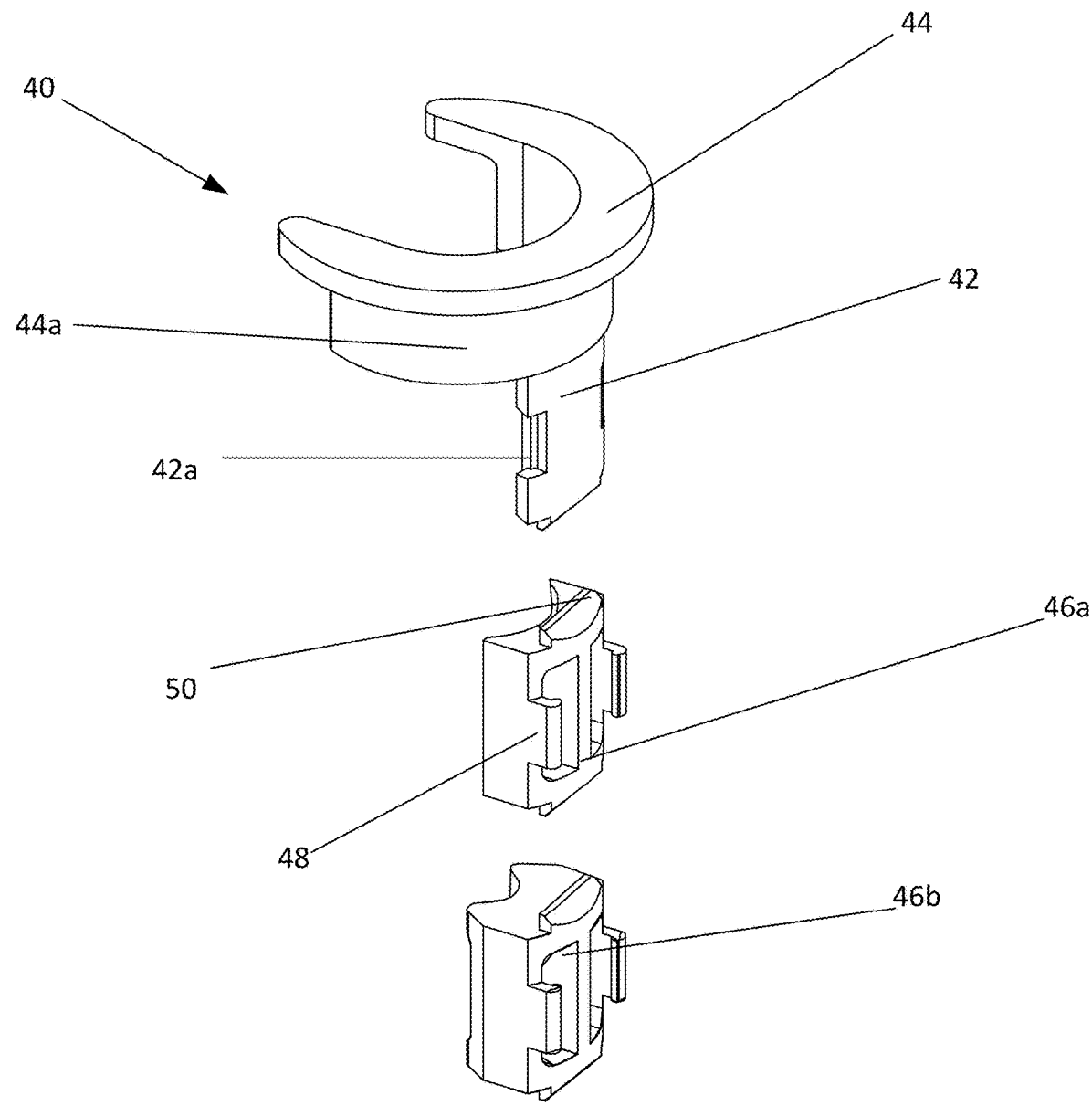
FIG. 8 is the cable stabilizer of FIG. 7 with a first and a second spacer separated from the cable stabilizer.
Figure 9:
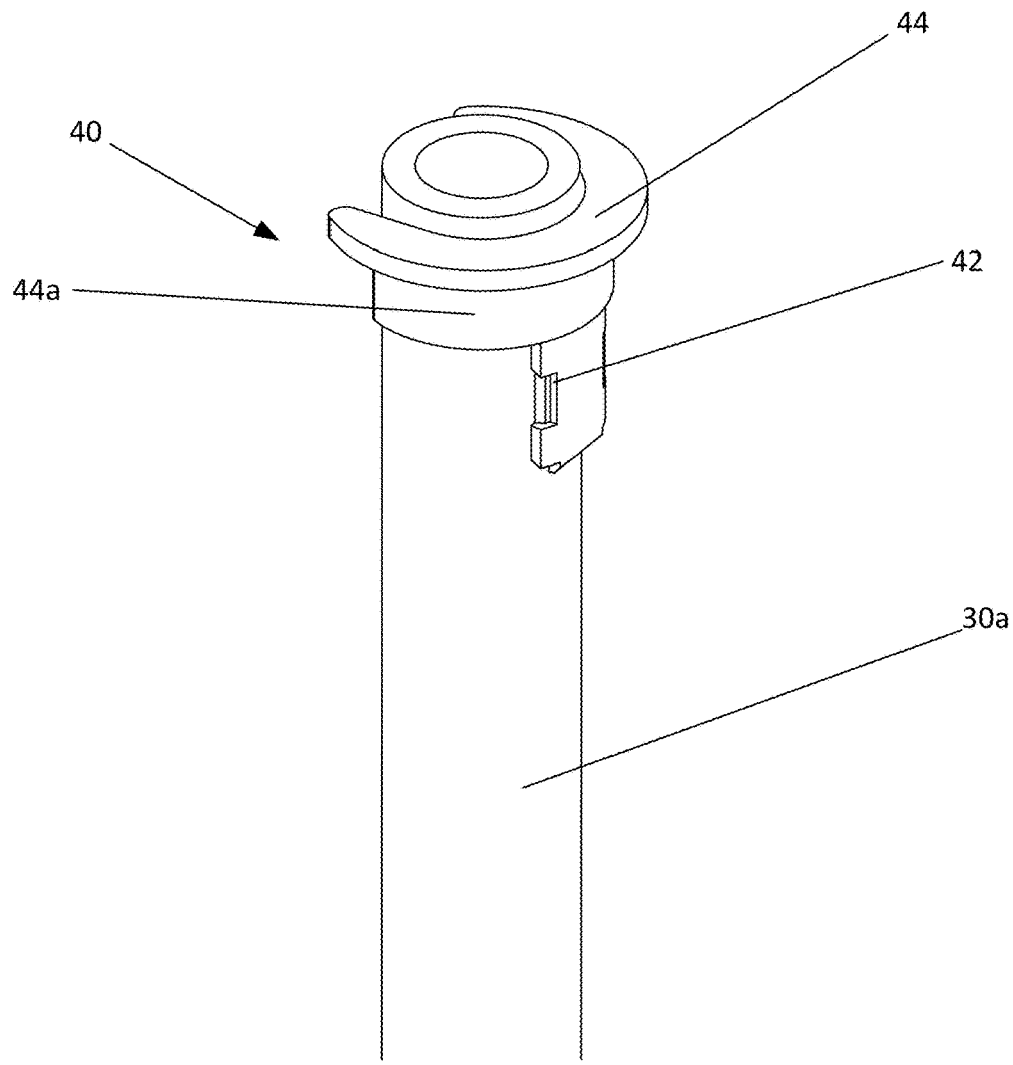
FIG. 9 is the cable stabilizer of FIG. 8 with the first and second spacer removed and a cable anchored to the cable stabilizer.
Figure 10:
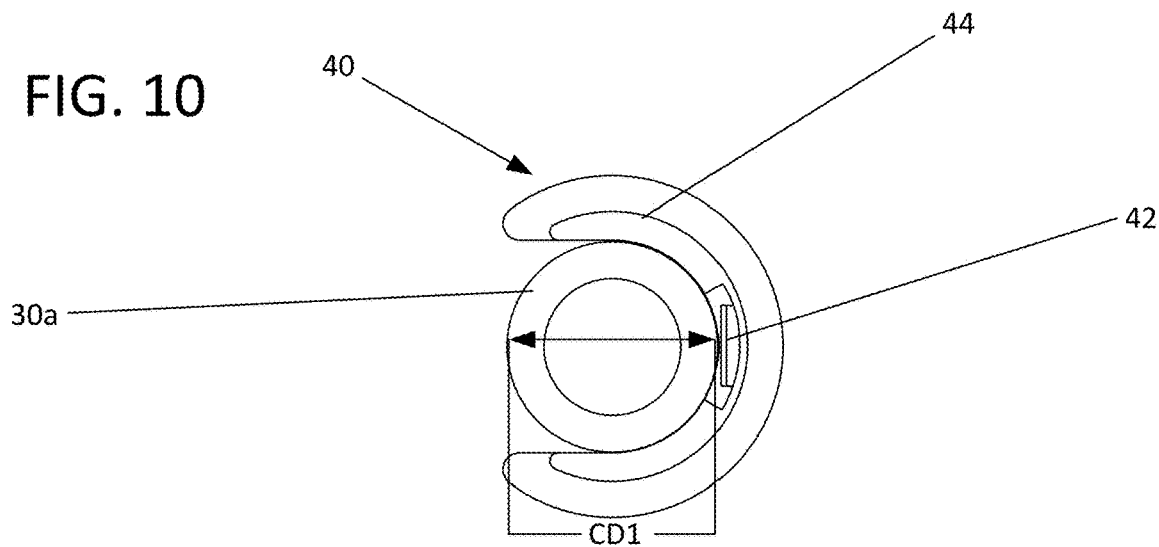
FIG. 10 is the cable stabilizer and cable of FIG. 9 from a top view.

Referring to FIG. 7, the cable stabilizer 40 is shown in isolation prior to use within the port sleeve 28. The cable anchoring portion 42 of the cable stabilizer 40 is adapted to accommodate a first cable 30a having a first cross-dimension CD1 as can be seen in FIGS. 9 and 10. It will be appreciated that the cable 30a or any other cables discussed hereafter can be attached to the cable anchoring portion using a strap, tape, or other fastening element. In some examples the strap can include a band clamp or a tie wrap.

In order to accommodate other cables with different cross-dimensions, the cable stabilizer includes a first and second spacer 46a, 46b. It will be appreciated that more or fewer spacers can be included with the cable stabilizer 40. The first and second spacers 46a, 46b can be removed by breaking thin portions 50 of the cable stabilizer 40 prior to use. The first and second spacers 46a, 46b can additionally be configured differently depending on the desired configuration. In some examples, the spacers 46a, 46b can be separate or attached to the cable stabilizer 40 in a different manner. Once the first and second spacers 46a, 46b are removed from the cable stabilizer 40, they can be attached to the cable anchoring portion 42 if a cable of the cross-dimension other than CD1 is being used or discarded if a cable with the cross-dimension CD1 is being used. The first and second spacers 46a, 46b can be individually removably attached to the cable anchoring portion 42 of the cable stabilizer 40 when desired for use with a particular cable. In this particular example, each spacer 46a, 46b include resilient arms 48. The resilient arms 48 can snap into a mating portion 42a of the cable anchoring portion 42.

Figure 11:
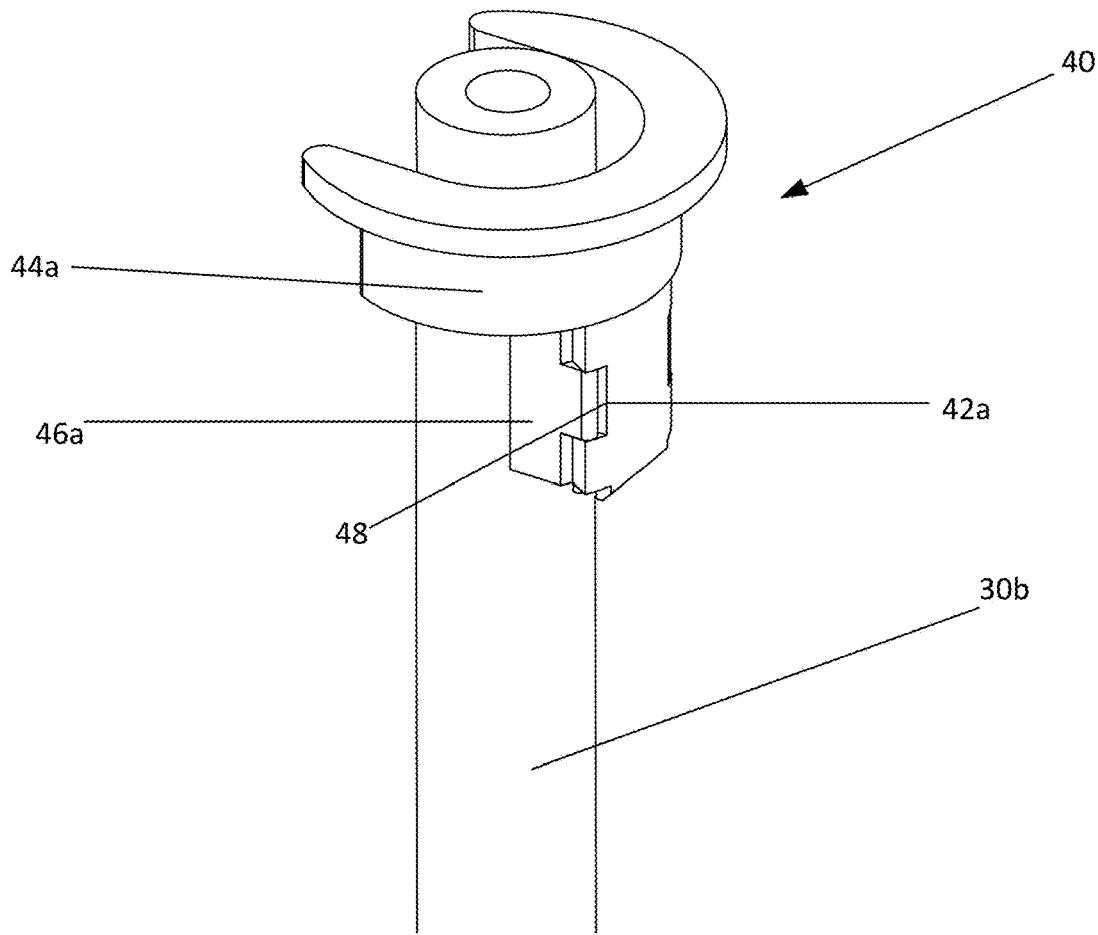
FIG. 11 is the cable stabilizer of FIG. 8 with the first spacer attached to the cable stabilizer and a cable anchored to the spacer.
Figure 12:
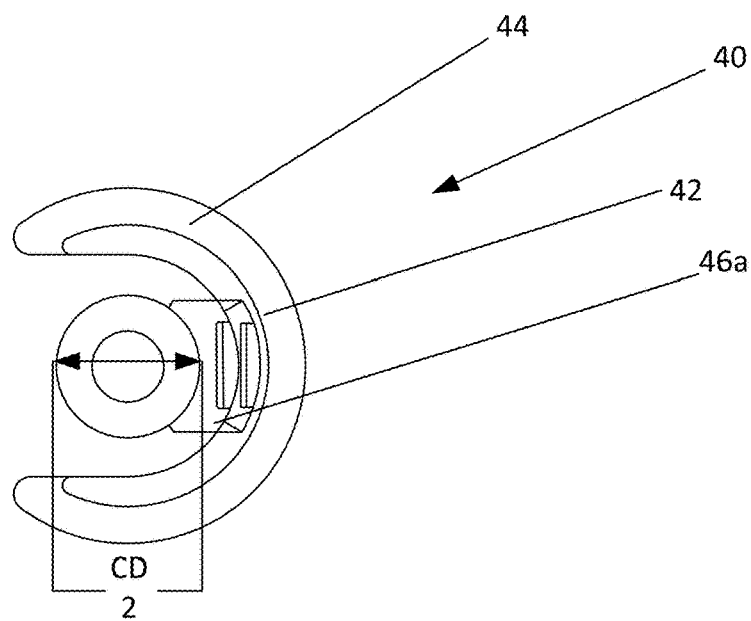
FIG. 12 is a top view of the cable stabilizer, spacer, and cable of FIG. 11.
Figure 13:
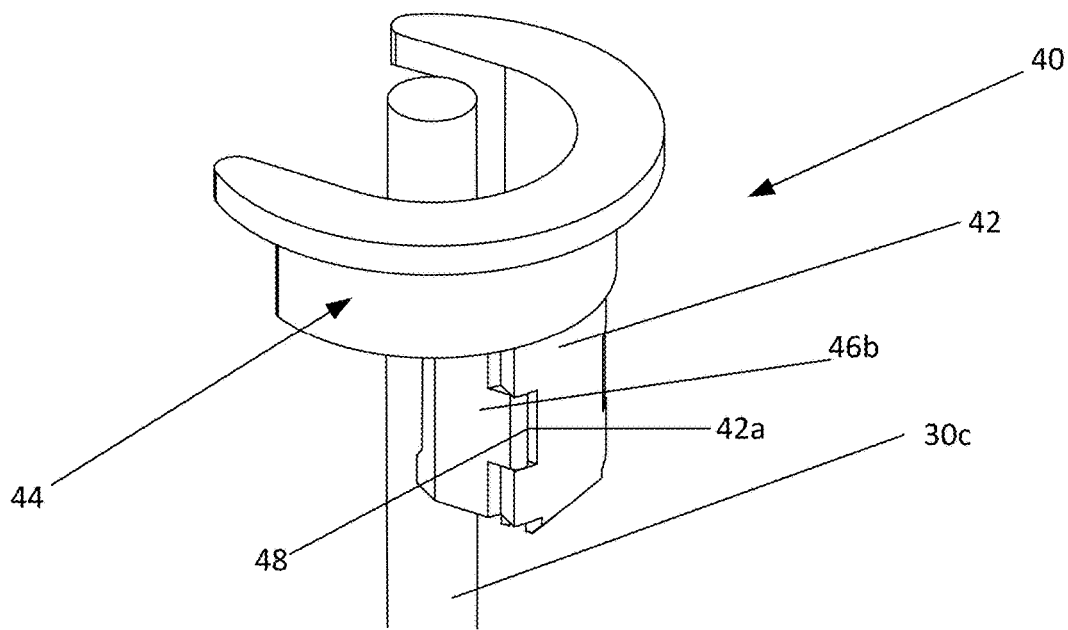
FIG. 13 is the cable stabilizer of FIG. 8 with the second spacer attached to the cable stabilizer and a cable anchored to the second spacer.
Figure 14:
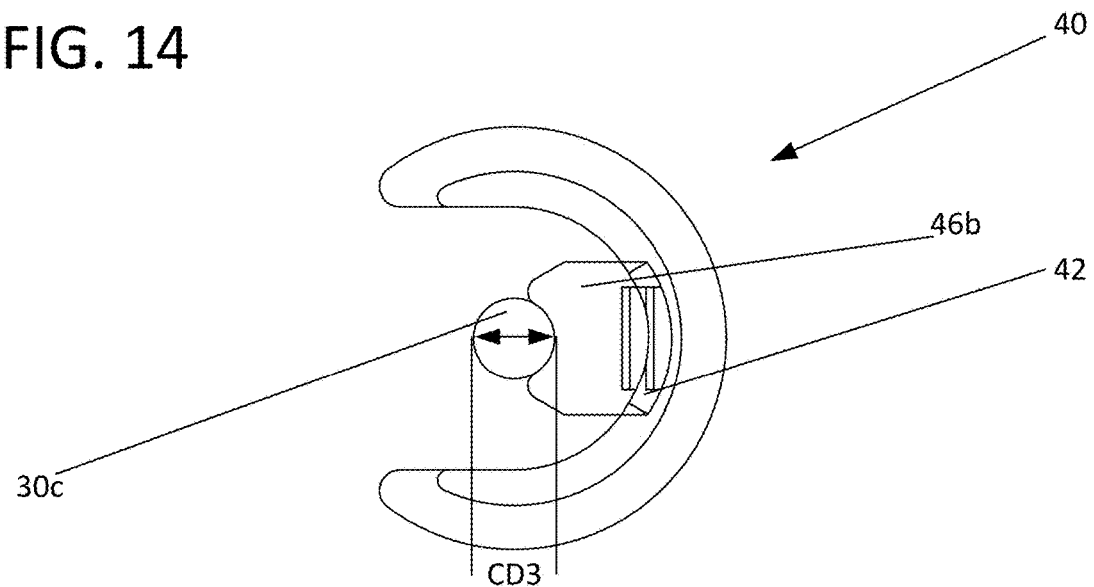
FIG. 14 is a top view of the cable stabilizer, spacer and cable of FIG. 13.

FIGS. 11 and 12 show the first spacer 46a attached to the cable anchoring portion 42 of the cable stabilizer 40. The first spacer 46a is attached to a cable 30b similar to how the cable anchoring portion 42 is attached to the cable 30a in FIGS. 9 and 10. However, the cable 30b has a smaller cross-dimension CD2 than the cross-dimension CD1 of the cable 30a. Similarly, FIGS. 13 and 14 show the second spacer 46b attached to the cable anchoring portion 42 of the cable stabilizer 40 anchoring a cable 30c. The cable 30c has a cross-dimension CD3 which is less than both the cross-dimension CD1 and the cross-dimension CD2. In certain examples, the cable stabilizer is configured to generally center a cable within the port sleeve 28, and the selection of no spacer or one of the spacers 46a, 46b is dependent upon cable size and the desire to generally center the cable with respect to the centerline of the port sleeve 28.

Figure 15:
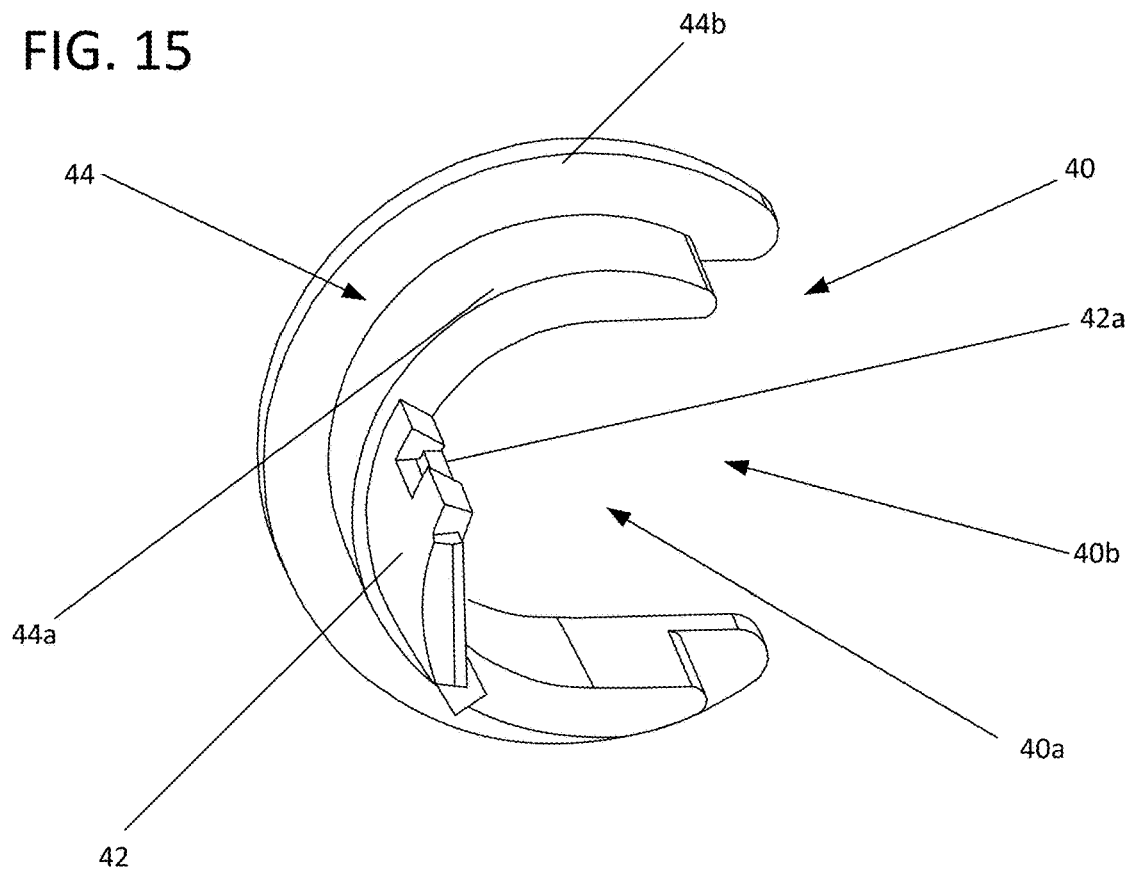
FIG. 15 is a perspective view of the cable stabilizer of FIG. 8 with the first and second spacers removed.
Figure 16:
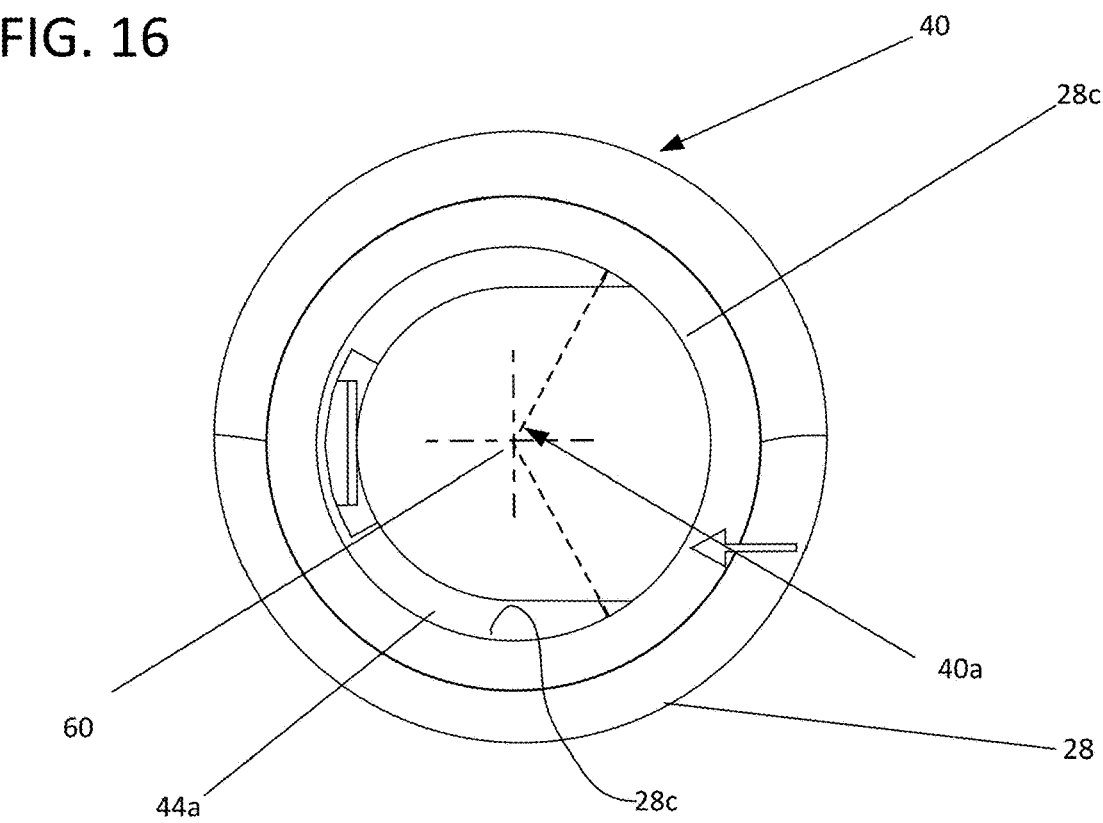
FIG. 16 is a bottom view of the cable stabilizer of FIG. 15 mounted within a port sleeve of the enclosure of FIG. 1.

Referring to FIG. 15, the cable stabilizer 40 is shown with the first and second spacers 46a, 46b removed. FIG. 16 shows a bottom view of the cable stabilizer 40 within the port sleeve 28 in isolation. The lateral stabilization portion 44 includes an outer cylindrical curvature 44a which is configured to fit within the inner cylindrical curvature 28c of the port sleeve 28. The outer cylindrical curvature 44a defines at least a portion of a cylinder. The cable stabilizer 40 defines an axial cable passage 40a that extends along a central axis 60. The central axis 60 is adapted to align with the centerline of the port sleeve 28 when the cable stabilizer is installed in the port sleeve 28. The outer cylindrical curvature 44a extends more than 180 degrees about the central axis 60. In some examples, the outer cylindrical portion extends at least 200 degrees or at least 210 degrees or at least 220 degrees about the central axis 60. The cable stabilizer 40 is configured to anchor the cable 30 generally in co-axial alignment with the central axis 60. It will be appreciated that the spacers 46a, 46b are also configured to anchor their respective cables 30b, 30c about generally in co-axial alignment with the central axis 60. The cable stabilizer 40 has a wrap-around configuration with an open side 40b facing a lateral direction for allowing the cable 30 to be laterally inserted into the axial cable passage 40a of the cable stabilizer 40.

Figure 17:
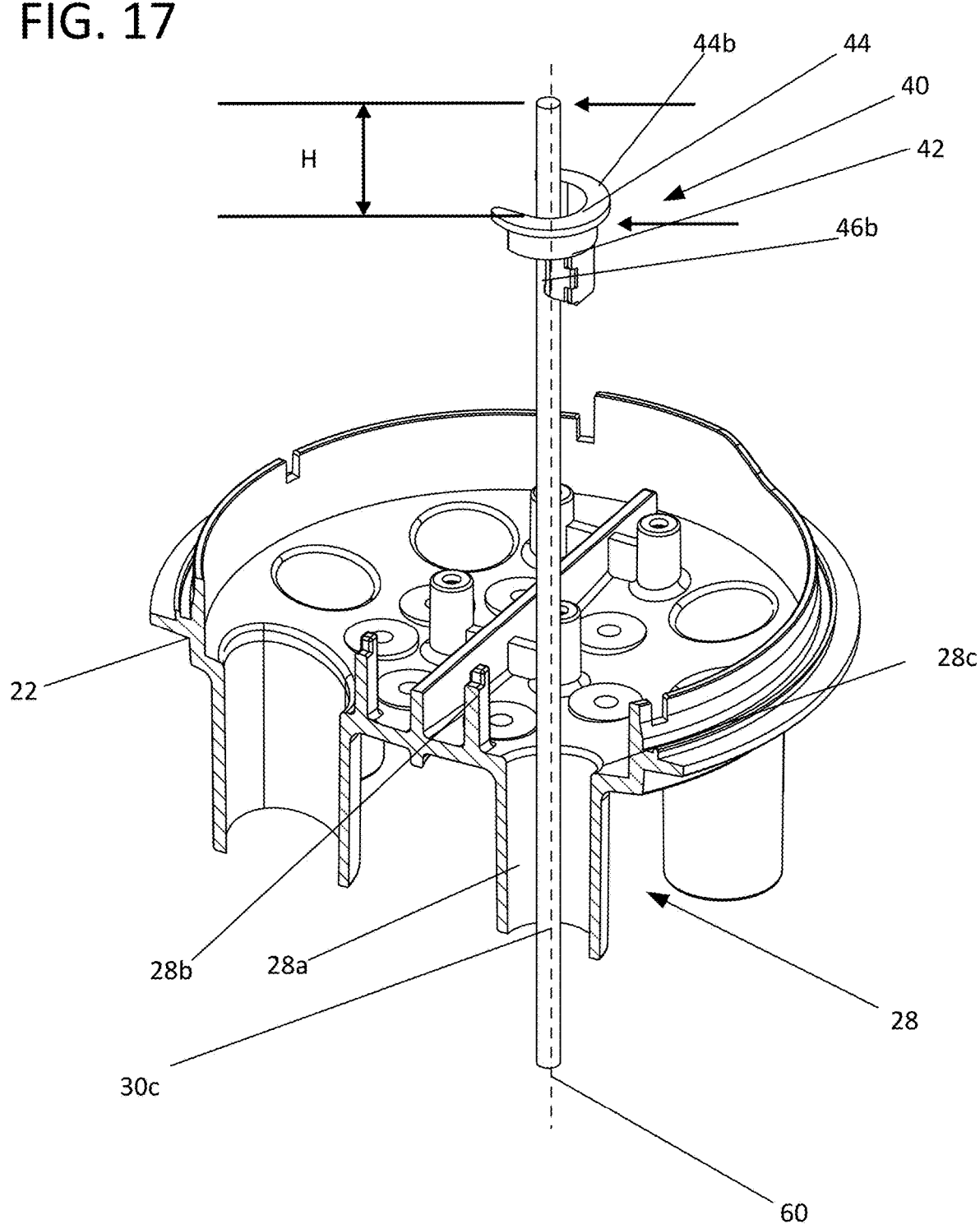
FIG. 17 is a cable anchored to a cable stabilizer prior to the cable stabilizer being inserted into the enclosure of FIG. 1.
Figure 18:
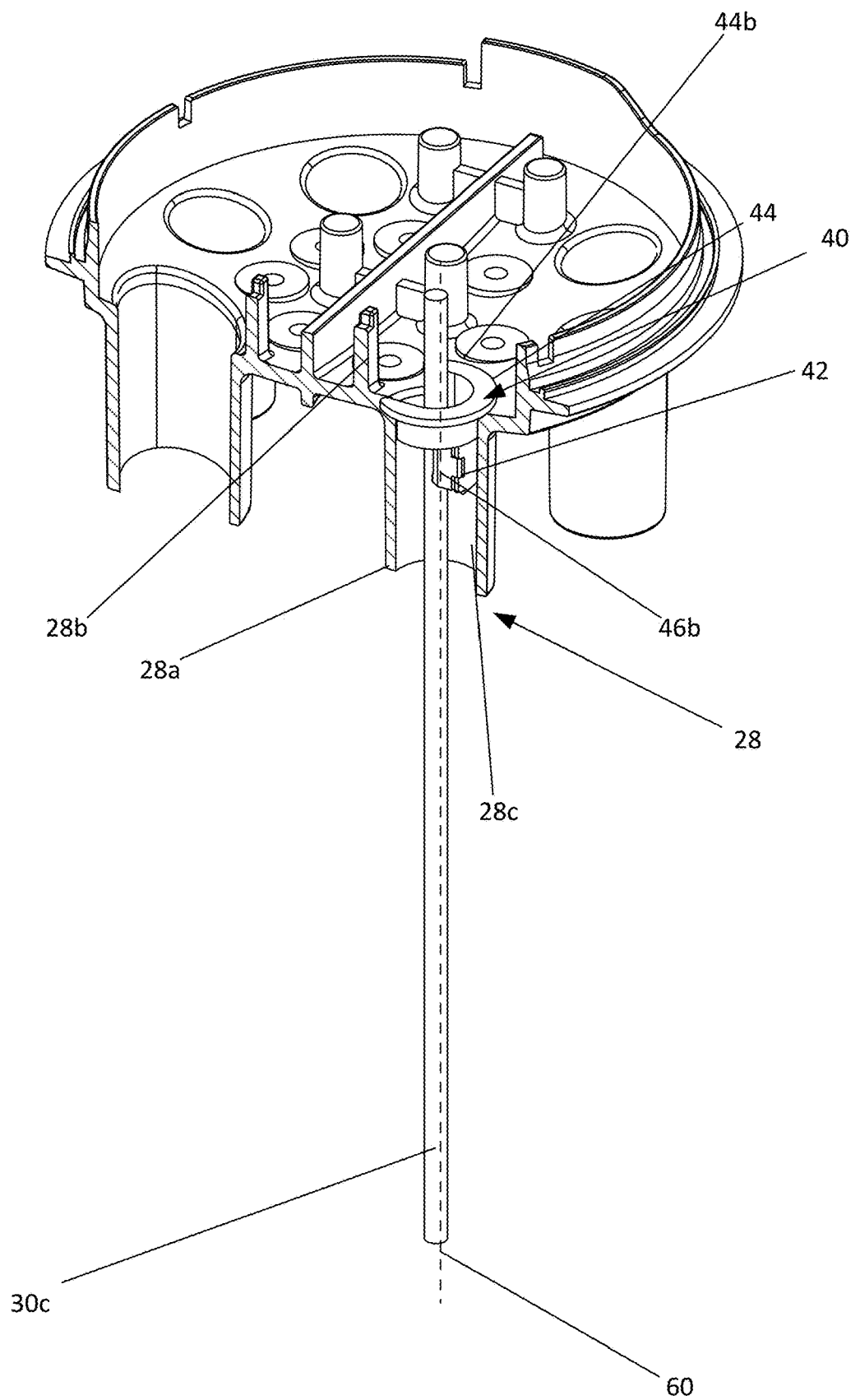
FIG. 18 is the cable stabilizer of FIG. 17 mounted within a port sleeve of the enclosure.
Figure 19:
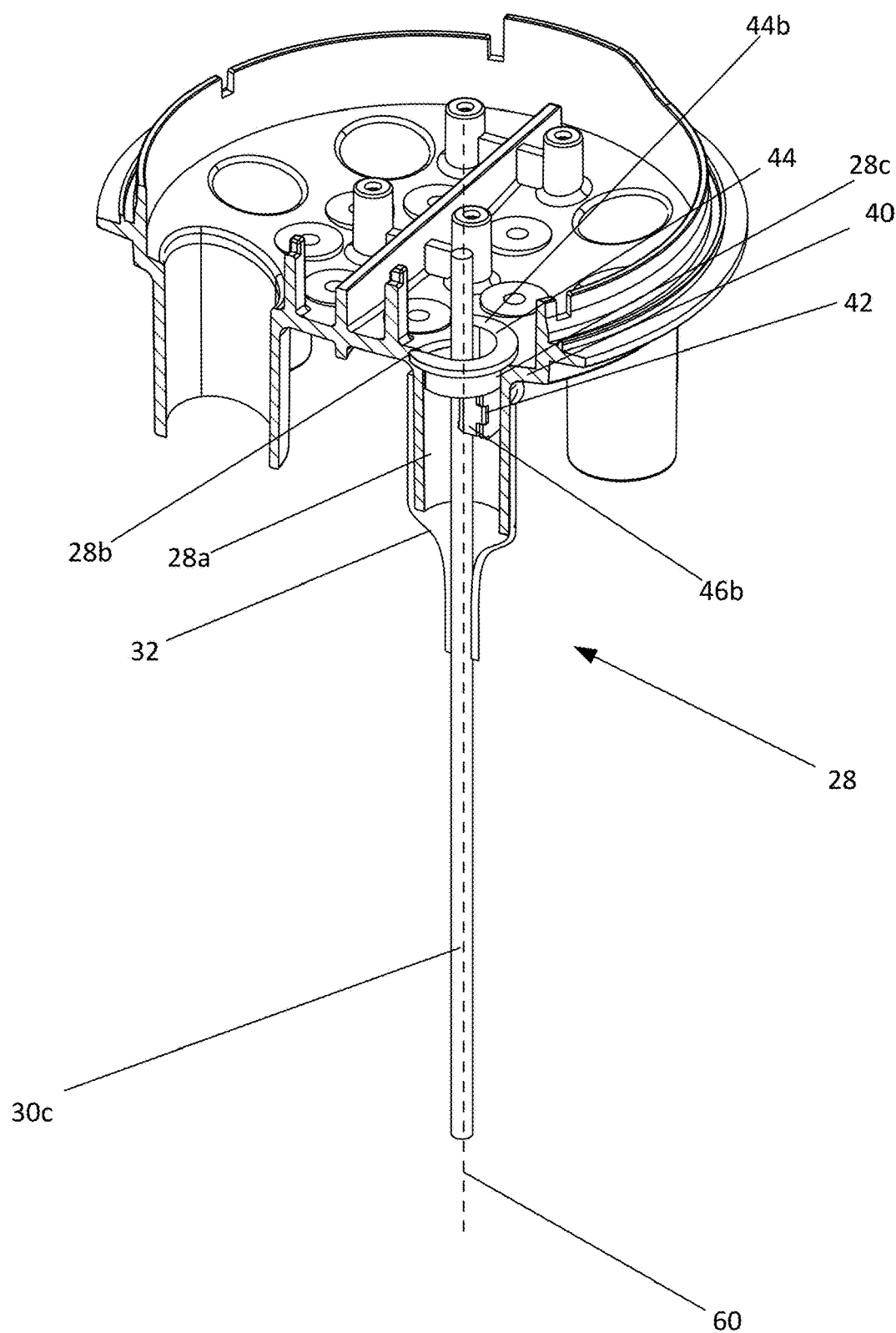
FIG. 19 is a partial cross-sectional view showing the cable stabilizer of FIG. 18 with a shape-memory sleeve attached to the port sleeve.
Figure 20:
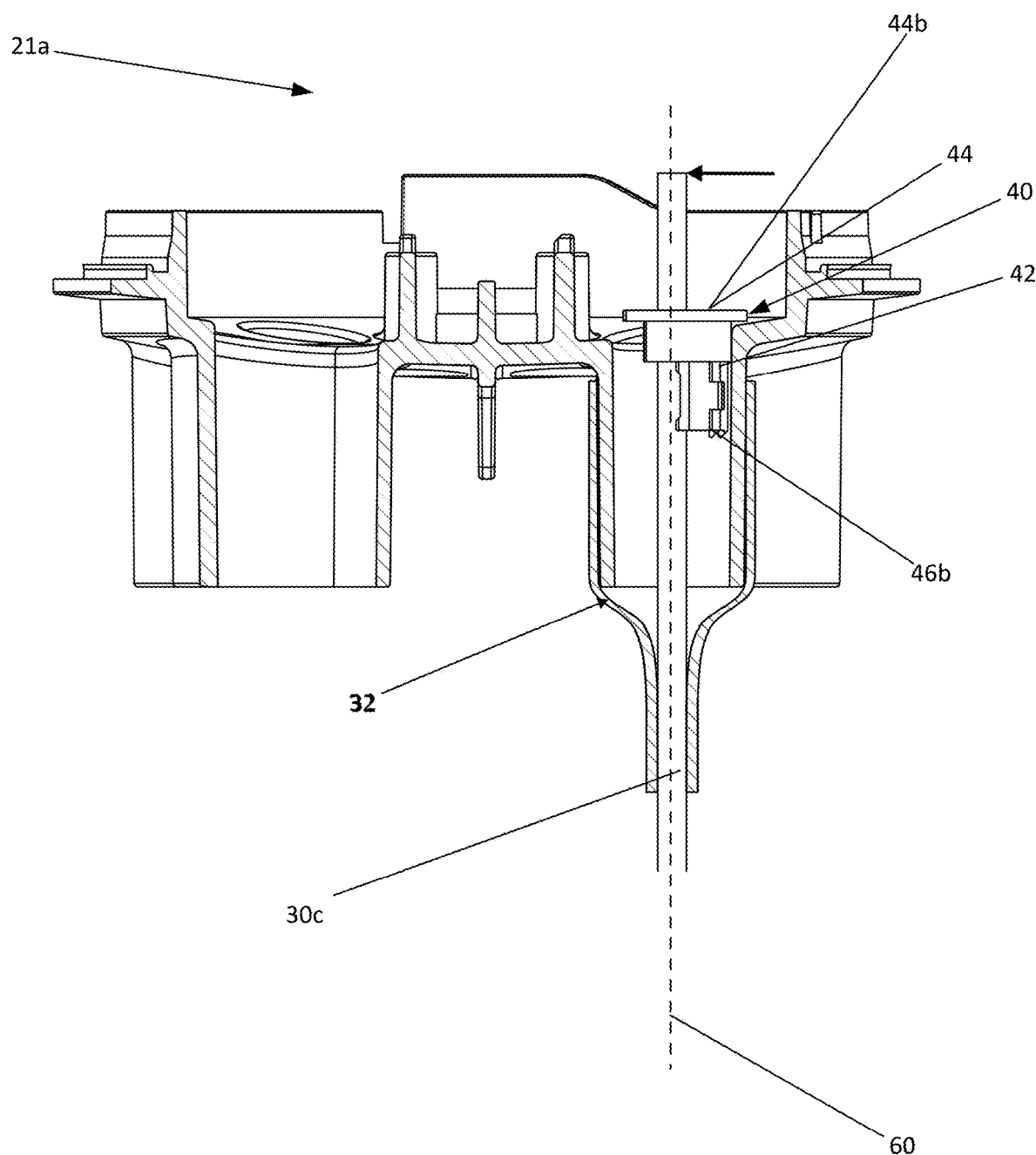
FIG. 20 is another view of the cable stabilizer of FIG. 19.
Figure 21:
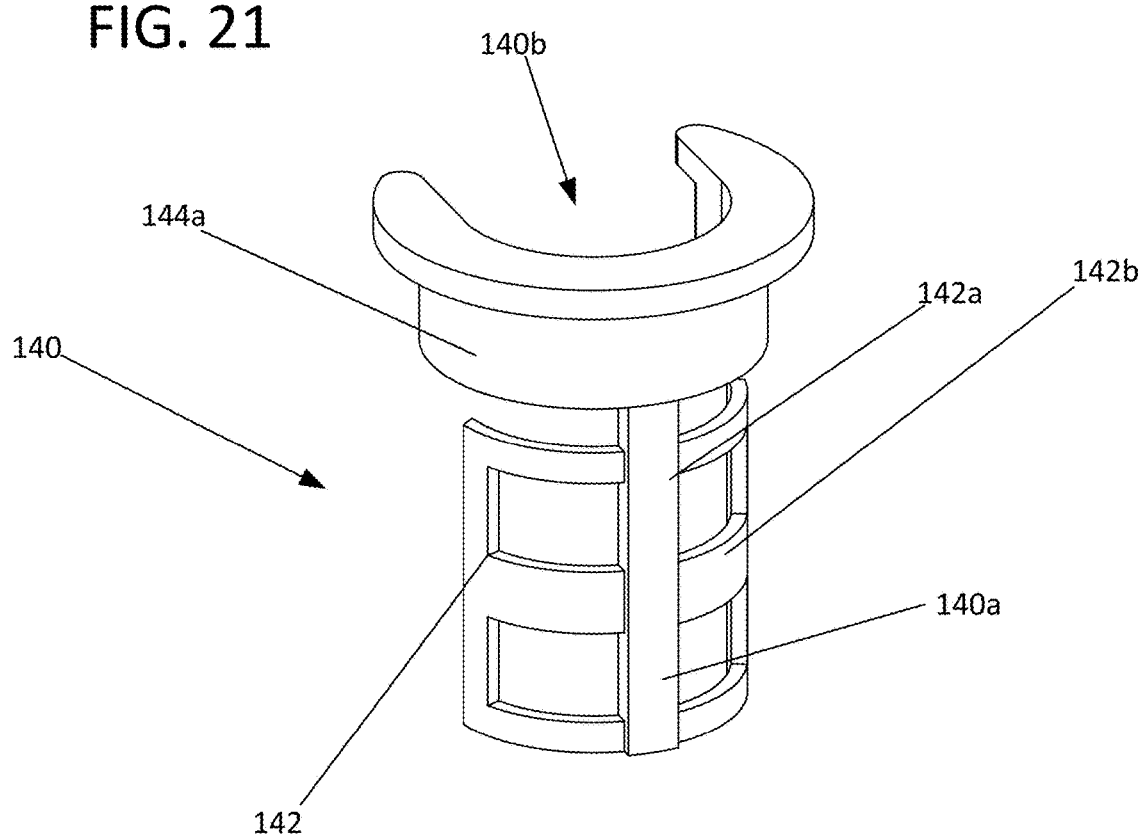
FIG. 21 is different cable stabilizer in accordance with the principles of the present disclosure.
Figure 22:
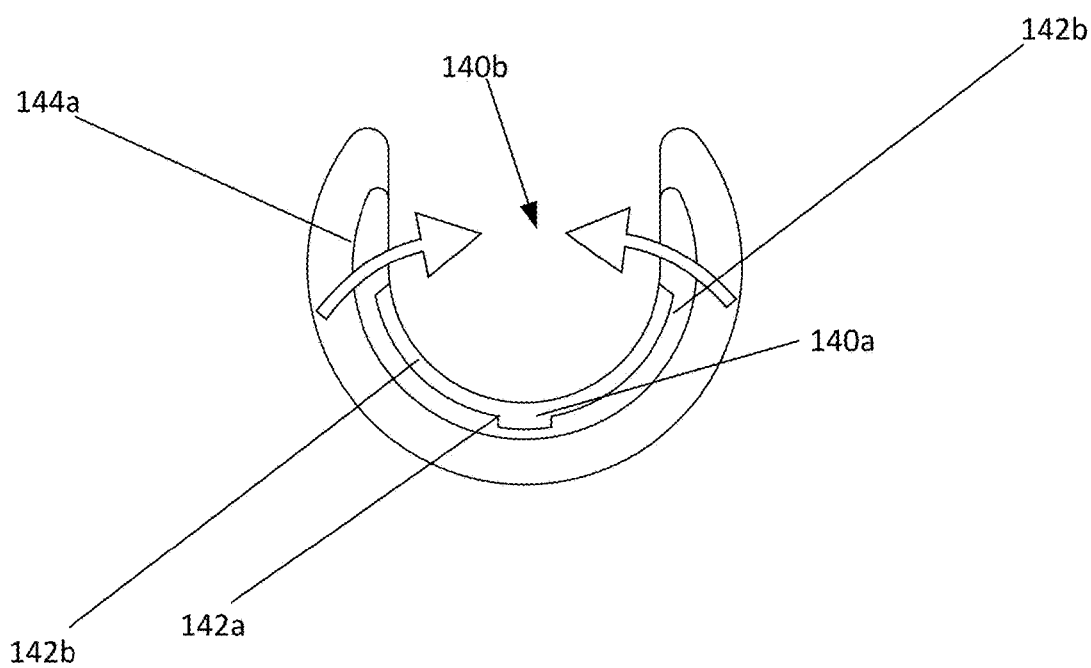
FIG. 22 is a bottom view of the cable stabilizer of FIG. 21.

FIGS. 17-19 show the installation process of a cable with a cable stabilizer 40. Referring to FIG. 17, the cable stabilizer 40 and the spacer 46b are shown anchored to the cable 30c prior to the installation of the cable 30 within the port sleeve 28. A desired height H of the cable 30 is shown extending above the cable stabilizer 40. The desired height H corresponds to the amount of the cable 30c that is desired to extend within the enclosure 20. FIG. 18 shows the cable stabilizer 40 loaded into the port sleeve through the inner end 28b of the port sleeve 28. The cable stabilizer 40 includes an axial stop which is depicted as a radial flange 44b. The radial flange 44b is adapted to seat the cable stabilizer on the inner end 28c of the port sleeve 28. After the cable stabilizer 40 is loaded into the port sleeve 28, the shape-memory sleeve 32 is attached as can be seen in FIG. 19. The shape-memory sleeve 32 can be attached by heating if the shape-memory sleeve 32 is a heat shrink sleeve or by other means depending on the configuration of the sleeve. FIG. 20 shows the cable mounted with the cable stabilizer 40. The cable 30c extends height H upwards from the cable stabilizer 40 and is the height of cable 30c that extends into the interior 21a of the enclosure 20. Additionally, the central axis 60 is shown aligned with the cable 30c.

Figure 23:
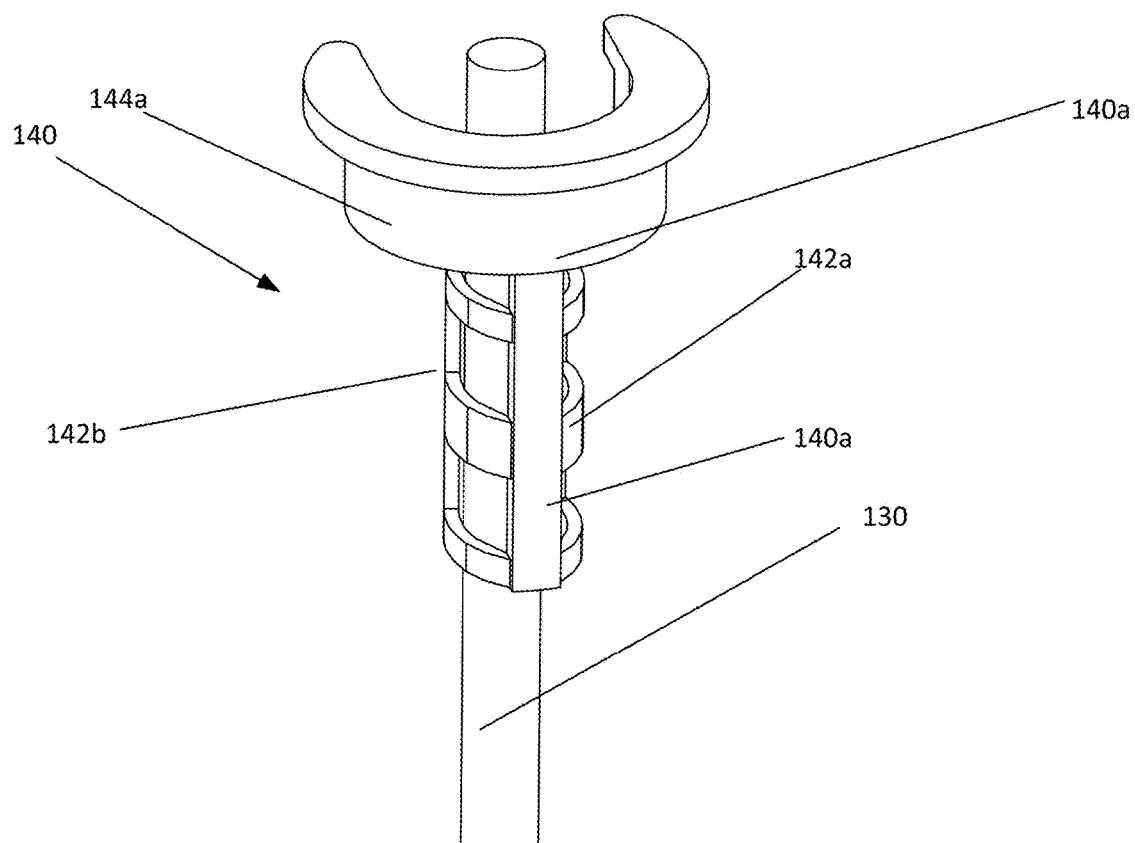
FIG. 23 is the cable stabilizer of FIG. 21 with a cable anchored thereto.
Figure 24:
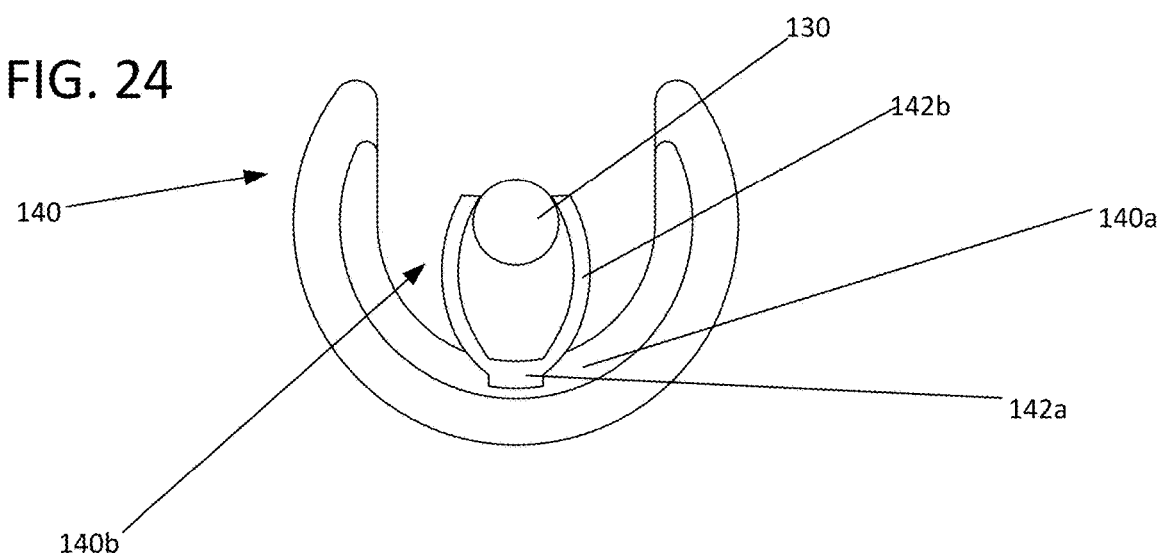
FIG. 24 is a bottom view of the cable stabilizer of FIG. 21 with the cable anchored thereto.
Figure 25:
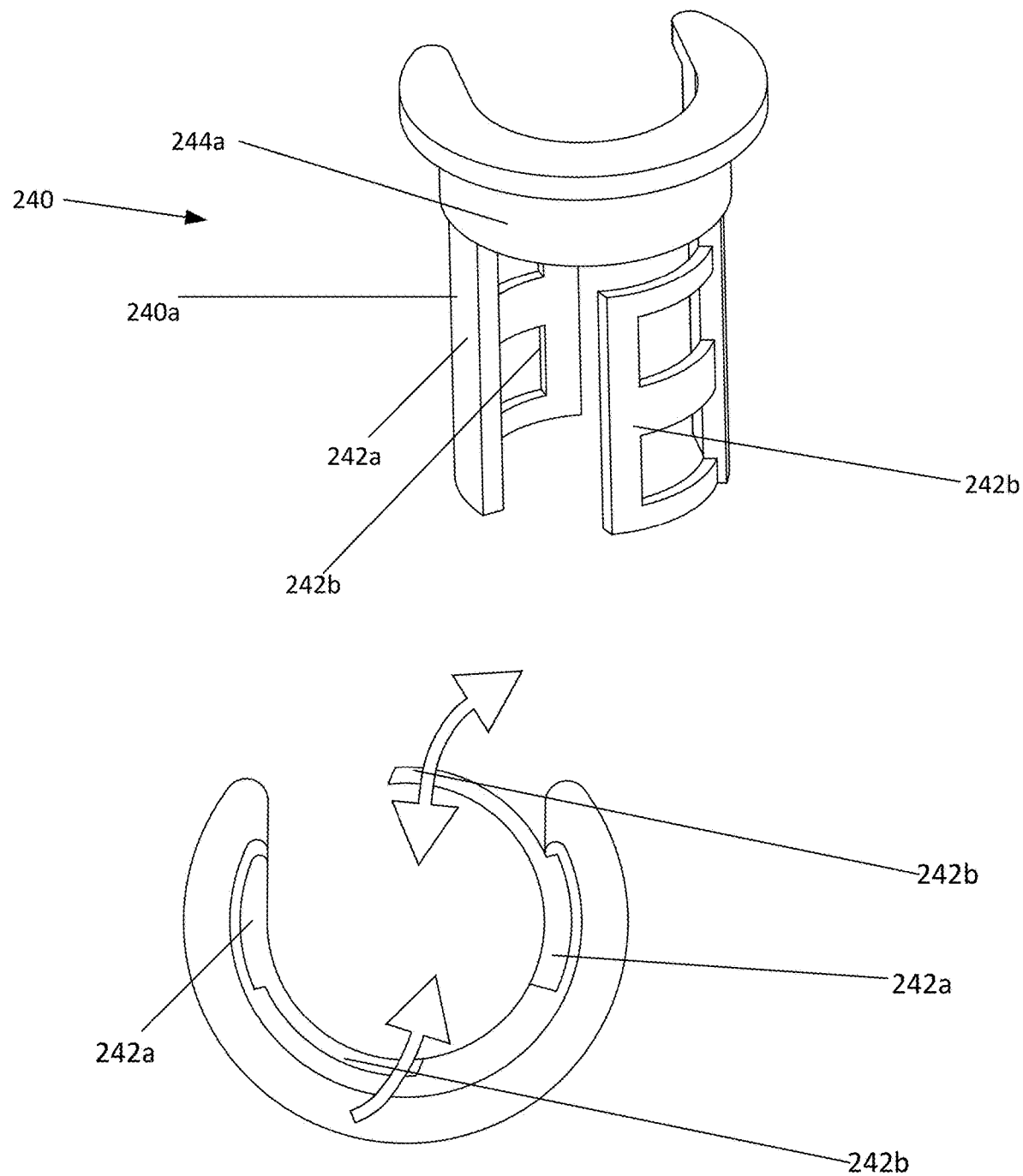
FIG. 25 is a different cable stabilizer in accordance with the principles of the present disclosure.

Referring to FIGS. 21-24, a different cable stabilizer 140 in accordance with the principles of the present disclosure is shown. The cable stabilizer 140 is similar to the cable stabilizer 40, however, the cable stabilizer 140 includes flexible anchoring arms 142 which a cable 130 can be secured between as can be seen at FIGS. 23 and 24. The flexible anchoring arms 142 flex towards the cable 130 as the cable 130 is secured to the flexible anchoring arms 142 (e.g., with a cable tie or a strap). The flexible anchoring arms 142 have a cantilevered configuration with base ends 142a integral to a base support 140a. The base support 140a extends downward from a cylindrical curvature 144a of the cable stabilizer 140 and free ends 142b that project into a cable pass-through channel 140b of the cable stabilizer 140. In this example, the flexible anchoring arms 142 extend in opposite directions from the base ends 142a to the free ends 142b (e.g., away from one another) and the free ends are adapted to oppose one another.

Figure 27:
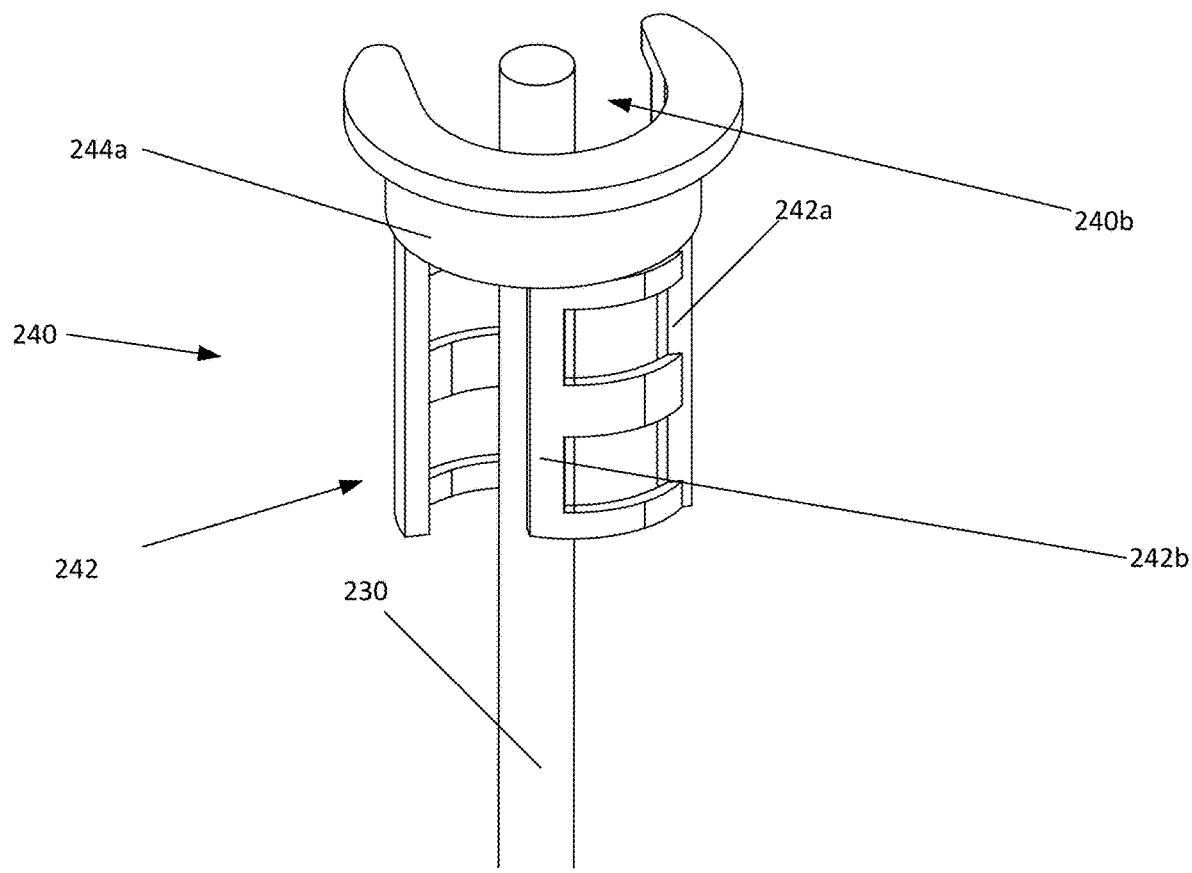
FIG. 27 is the cable stabilizer of FIG. 25 with a cable anchored thereto.
Figure 28:
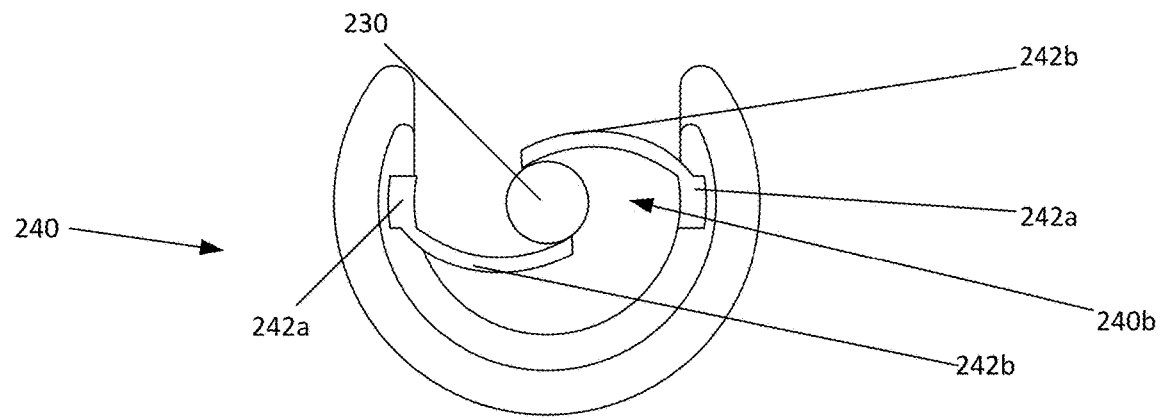
FIG. 28 is a bottom view of the cable stabilizer of FIG. 25 with the cable anchored thereto.

Referring to FIGS. 25-28, a different cable stabilizer 240 in accordance with the principles of the present disclosure is shown. The cable stabilizer 240 is similar to the cable stabilizer 140 and includes flexible anchoring arms 242 with a cantilevered configuration. In this example, there are multiple base supports 240a which each extend downwards from a cylindrical curvature 244a of the cable stabilizer 240. The flexible anchoring arms 242 include base ends 242a each attached to the base supports 240a. Free ends 242b extend towards one another to secure a cable 230 therebetween within a cable passthrough channel 240b, as seen in FIGS. 27 and 28. From the forgoing detailed description, it will be evident that modifications and variations can be made without departing from the spirit or scope of the invention.

What is claimed is:

1. An enclosure assembly comprising:
   a housing defining an interior, the housing including a port sleeve defining a cable port for routing a cable into the interior of the housing, the port sleeve including an outer end positioned at an exterior of the housing and an inner end positioned at the interior of the housing;
   a cable stabilizer that fits within the port sleeve, the cable stabilizer including a cable anchoring portion configured for allowing the cable to be secured thereto within the port sleeve, the cable stabilizer also including a lateral stabilization portion that engages an interior of the port sleeve to prevent lateral movement of the cable anchoring portion of the cable stabilizer within the port sleeve, wherein the cable anchoring portion is adapted to accommodate a first cable having a first cross-dimension size, wherein the cable stabilizer includes a first spacer adapted to be attached to the cable anchoring portion to accommodate a second cable having a second cross-dimension size, and wherein the second cross-dimension size is smaller than the first cross-dimension size; and
   a heat shrink sleeve for securing the cable to the outer end of the port sleeve and to seal the cable relative to the port sleeve.

2. The enclosure assembly of claim 1, wherein the lateral stabilization portion includes an outer cylindrical curvature that fits within an inner cylindrical curvature of the port sleeve, wherein the outer cylindrical curvature defines an outer cylindrical portion comprising at least a portion of a cylinder.

3. The enclosure assembly of claim 2, wherein the cable stabilizer defines an axial cable passage that extends along a central axis, and wherein the outer cylindrical portion extends more than 180 degrees about the central axis.

4. The enclosure assembly of claim 3, wherein the outer cylindrical portion extends at least 200 degrees, at least 210 degrees, or at least 220 degrees about the central axis.

5. The enclosure of claim 3, wherein the cable stabilizer is configured such that the cable is adapted to be anchored generally centered along the central axis.

6. The enclosure of claim 3, wherein the cable stabilizer has a wrap-around configuration with an open side facing in a lateral direction for allowing the cable to be laterally inserted into the axial cable passage of the cable stabilizer.

7. The enclosure of claim 1, wherein the cable stabilizer is loaded into the port sleeve through the inner end of the port sleeve and includes an axial stop for limiting a depth that the cable stabilizer can be inserted into the port sleeve.

8. The enclosure of claim 7, wherein the cable stabilizer is configured such that the cable is anchored to the cable anchoring portion prior to installation of the cable stabilizer in the port sleeve.

9. The enclosure of claim 8, wherein the axial stop is defined by a radial flange of the cable stabilizer adapted to seat on the inner end of the port sleeve.

10. The enclosure of claim 1, wherein the cable anchoring portion includes flexible anchoring arms between which the cable is secured.

11. The enclosure of claim 10, wherein the cable is secured to ends of the flexible anchoring arms and wherein the flexible anchoring arms flex toward the cable as the cable is secured to the ends of the flexible anchoring arms.

12. The enclosure of claim 10, wherein the flexible anchoring arms have a cantilevered configuration with base ends integral with at least one base support, the at least one base support defined by the cable stabilizer and free ends that project into a cable pass-through channel of the cable stabilizer.

13. The enclosure of claim 12, wherein the flexible anchoring arms extend from one base support opposite directions from the base ends to the free ends.

14. The enclosure of claim 12, wherein the flexible anchoring arms extend from two base supports towards one another from the base ends to the free ends.

15. The enclosure of claim 1, wherein the cable is secured to the cable anchoring portion via a strap or tape.

16. The enclosure of claim 15, wherein the strap includes a band clamp or a tie wrap.

17. The enclosure of claim 1, wherein the cable stabilizer includes a second spacer adapted to be attached to the cable anchoring portion to accommodate a third cable having a third cross-dimension size, and wherein the third cross-dimension size is smaller than the second cross-dimension size.

18. The enclosure of claim 1, wherein the cable anchoring portion is configured to generally center the first cable along a central cable pass-through axis of the cable stabilizer, and wherein the first spacer is configured to generally center the second cable along the central cable pass-through axis of the cable stabilizer when mounted to the cable anchoring portion.

19. An enclosure assembly comprising:
a housing defining an interior, the housing including a port sleeve defining a cable port for routing a cable into the interior of the housing, the port sleeve including an outer end positioned at an exterior of the housing and an inner end positioned at the interior of the housing;
a cable stabilizer that fits within the port sleeve, the cable stabilizer including a cable anchoring portion configured for allowing the cable to be secured thereto within the port sleeve, the cable stabilizer also including a lateral stabilization portion that engages an interior of the port sleeve to prevent lateral movement of the cable anchoring portion of the cable stabilizer within the port sleeve, wherein the cable anchoring portion includes flexible anchoring arms between which the cable is secured, wherein the flexible anchoring arms have a cantilevered configuration with base ends integral with at least one base support, the at least one base support defined by the cable stabilizer and free ends that project into a cable pass-through channel of the cable stabilizer, wherein the flexible anchoring arms extend from two base supports towards one another from the base ends to the free ends; and
a heat shrink sleeve for securing the cable to the outer end of the port sleeve and to seal the cable relative to the port sleeve.

20. The enclosure assembly of claim 19, wherein the lateral stabilization portion includes an outer cylindrical curvature that fits within an inner cylindrical curvature of the port sleeve, wherein the outer cylindrical curvature defines an outer cylindrical portion comprising at least a portion of a cylinder.

21. The enclosure assembly of claim 20, wherein the cable stabilizer defines an axial cable passage that extends along a central axis, and wherein the outer cylindrical portion extends more than 180 degrees about the central axis.

22. The enclosure assembly of claim 21, wherein the outer cylindrical portion extends at least 200 degrees, at least 210 degrees, or at least 220 degrees about the central axis.

23. The enclosure of claim 21, wherein the cable stabilizer is configured such that the cable is adapted to be anchored generally centered along the central axis.

24. The enclosure of claim 21, wherein the cable stabilizer has a wrap-around configuration with an open side facing in a lateral direction for allowing the cable to be laterally inserted into the axial cable passage of the cable stabilizer.

25. The enclosure of claim 19, wherein the cable stabilizer is loaded into the port sleeve through the inner end of the port sleeve and includes an axial stop for limiting a depth that the cable stabilizer can be inserted into the port sleeve.

26. The enclosure of claim 25, wherein the cable stabilizer is configured such that the cable is anchored to the cable anchoring portion prior to installation of the cable stabilizer in the port sleeve.

27. The enclosure of claim 26, wherein the axial stop is defined by a radial flange of the cable stabilizer adapted to seat on the inner end of the port sleeve.

28. The enclosure of claim 19, wherein the cable anchoring portion is adapted to accommodate a first cable having a first cross-dimension size, wherein the cable stabilizer includes a first spacer adapted to be attached to the cable anchoring portion to accommodate a second cable having a second cross-dimension size, and wherein the second cross-dimension size is smaller than the first cross-dimension size.

29. The enclosure of claim 28, wherein the cable stabilizer includes a second spacer adapted to be attached to the cable anchoring portion to accommodate a third cable having a third cross-dimension size, and wherein the third cross-dimension size is smaller than the second cross-dimension size.

30. The enclosure of claim 28, wherein the cable anchoring portion is configured to generally center the first cable along a central cable pass-through axis of the cable stabilizer, and wherein the first spacer is configured to generally center the second cable along the central cable pass-through axis of the cable stabilizer when mounted to the cable anchoring portion.

31. The enclosure of claim 19, wherein the cable is secured to ends of the flexible anchoring arms and wherein the flexible anchoring arms flex toward the cable as the cable is secured to the ends of the flexible anchoring arms.

32. The enclosure of claim 19, wherein the cable is secured to the cable anchoring portion via a strap or tape.

33. The enclosure of claim 19, wherein the strap includes a band clamp or a tie wrap.

\* \* \* \* \*